United States Patent
Fukuoka et al.

(10) Patent No.: US 7,528,213 B2
(45) Date of Patent: *May 5, 2009

(54) METHOD FOR EFFICIENTLY PRODUCING AN AROMATIC POLYCARBONATE

(75) Inventors: Shinsuke Fukuoka, Kurashiki (JP); Hiroshi Hachiya, Kurashiki (JP); Kazuhiko Matsuzaki, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 10/592,690

(22) PCT Filed: Jun. 14, 2005

(86) PCT No.: PCT/JP2005/010854

§ 371 (c)(1), (2), (4) Date: Sep. 13, 2006

(87) PCT Pub. No.: WO2005/121211

PCT Pub. Date: Dec. 22, 2005

(65) Prior Publication Data

US 2008/0234444 A1 Sep. 25, 2008

(30) Foreign Application Priority Data

Jun. 14, 2004 (JP) .............................. 2004-176205

(51) Int. Cl.
*C08G 64/00* (2006.01)
*C08G 63/02* (2006.01)
(52) U.S. Cl. .................. 528/196; 422/131; 528/198
(58) Field of Classification Search ................. 422/131; 528/196, 198
See application file for complete search history.

(56) References Cited

U.S. PATENT DOCUMENTS

| | | | |
|---|---|---|---|
| 2,964,297 A | 12/1960 | Davis et al. | |
| 3,153,008 A | 10/1964 | Fox | |
| 3,888,826 A | 6/1975 | Yamana et al. | |
| 5,384,389 A | 1/1995 | Alewelt et al. | |
| 5,589,564 A | 12/1996 | Komiya et al. | |
| 5,840,826 A | 11/1998 | Komiya et al. | |
| 6,107,440 A * | 8/2000 | Hachiya et al. | ............. 528/196 |
| 6,265,526 B1 | 7/2001 | Komiya et al. | |
| 6,320,015 B1 | 11/2001 | Komiya et al. | |
| 6,429,276 B1 | 8/2002 | Komiya et al. | |
| 2002/0183428 A1* | 12/2002 | Hachiya et al. | ............. 524/315 |

FOREIGN PATENT DOCUMENTS

| | | |
|---|---|---|
| GB | 1007302 | 10/1965 |
| JP | 52-36159 | 9/1977 |
| JP | 2-153923 A | 6/1990 |
| JP | 6-248067 A | 9/1994 |
| JP | 8-225641 A | 9/1996 |
| JP | 8-225643 A | 9/1996 |
| JP | 8-325373 A | 12/1996 |
| JP | 10-81741 A | 3/1998 |
| JP | 10-251396 A | 9/1998 |
| JP | 10-298279 A | 11/1998 |
| JP | 2002-249575 A | 9/2002 |

* cited by examiner

*Primary Examiner*—Terressa M Boykin
(74) *Attorney, Agent, or Firm*—Birch, Stewart, Kolasch & Birch, LLP

(57) ABSTRACT

It is a task of the present invention to provide a method which enables the production of a high quality, high performance aromatic polycarbonate (which is colorless and has excellent mechanical properties) from a molten aromatic polycarbonate prepolymer obtained from an aromatic dihydroxy compound and a diaryl carbonate, wherein the polycarbonate can be stably produced on a commercial scale at 1 to 50 t/hr for a long time without the need for a large amount of an inert gas. In the present invention, this task has been accomplished by a method for producing an aromatic polycarbonate by the melt transesterification process, in which the prepolymer is caused to absorb a specific amount of an inert gas, followed by polymerization using a guide-wetting fall polymerizer device having a specific structure, whereby a high quality, high performance aromatic polycarbonate as mentioned above can be stably produced on a commercial scale at 1 to 50 t/hr for a long time (more than several thousand hours, e.g., as long as 5,000 hours) without fluctuation of the molecular weight thereof.

11 Claims, 2 Drawing Sheets

METHOD FOR EFFICIENTLY PRODUCING AN AROMATIC POLYCARBONATE

FIELD OF THE INVENTION

The present invention relates to a method for efficiently producing an aromatic polycarbonate. More particularly, the present invention is concerned with a method for efficiently producing a high quality, high performance aromatic polycarbonate on a commercial scale at a rate of 1 t/hr or more, in which a molten aromatic polycarbonate prepolymer obtained by reacting an aromatic dihydroxy compound with a diaryl carbonate is caused to absorb a specific amount of an inert gas, and the resultant inert gas-absorbed molten prepolymer is polymerized by the use of a guide-wetting fall polymerizer device having a specific structure.

By the method of the present invention, a high quality, high performance aromatic polycarbonate which not only is colorless but also has excellent mechanical properties can be very stably produced at a rate of 1 t/hr or more for a long period of time (for example, as long as 5,000 hours), wherein the molecular weight of the aromatic polycarbonate can be maintained at a desired level. Therefore, the method of the present invention can be very advantageously employed for the commercial scale production of an aromatic polycarbonate.

PRIOR ART

In recent years, aromatic polycarbonates have been widely used in various fields as engineering plastics having excellent properties with respect to heat resistance, impact resistance, transparency and the like. With respect to methods for producing aromatic polycarbonates, various studies have heretofore been made. Of the methods studied, a process utilizing an interfacial polycondensation between an aromatic dihydroxy compound and phosgene (the so-called "phosgene process") has been commercialized, wherein 2,2-bis(4-hydroxyphenyl)propane (hereinafter, frequently referred to as "bisphenol A") can be mentioned as a representative example of the aromatic dihydroxy compound.

However, the interfacial polycondensation process has problems in that it is necessary to use phosgene, which is poisonous; that it is necessary to use a very large amount of methylene chloride as a polymerization solvent, which is considered to be harmful to human health and the environment, wherein methylene chloride is used in an amount which is ten times as large as the amount of the aromatic polycarbonate produced; that a reaction apparatus is likely to be corroded with chlorine-containing compounds, such as by-produced hydrogen chloride, by-produced sodium chloride, and methylene chloride used as a solvent; that difficulties are encountered in separating and removing chlorine-containing impurities (such as sodium chloride and residual methylene chloride), which adversely affect properties of the aromatic polycarbonate produced; and that it is necessary to handle a large amount of waste water containing methylene chloride and an unreacted aromatic dihydroxy compound (such as bisphenol A).

As a method for producing an aromatic polycarbonate from an aromatic dihydroxy compound and a diaryl carbonate, a melt transesterification process has conventionally been known, in which an aromatic polycarbonate is produced by performing an ester exchange reaction between an aromatic dihydroxy compound (such as bisphenol A) and a diaryl carbonate (such as diphenyl carbonate) in the molten state, while removing an aromatic monohydroxy compound produced (such as phenol) from the equilibrium polycondensation reaction system. Contrary to the interfacial polycondensation process, the melt transesterification process has an advantage in that a solvent need not be used. However, the melt transesterification process has the following serious problem. The transesterification is an equilibrium reaction, and the equilibrium constant thereof is small. Therefore, the equilibrium reaction does not proceed unless an aromatic monohydroxy compound produced (such as phenol) is efficiently removed from the surface of a molten reaction mixture obtained by the transesterification. As the polymerization proceeds, the viscosity of a polymer being formed increases during the progress of the polymerization reaction and, hence, it becomes difficult to remove efficiently an aromatic monohydroxy compound (such as phenol) from the polymerization reaction system, thus making it difficult to achieve a high degree of polymerization with respect to a polycarbonate produced. That is, differing from the case of a melt polycondensation process for producing a polycondensation polymer (such as a polyamide or a polyester) other than an aromatic polycarbonate, the melt polycondensation process for producing an aromatic polycarbonate has the following problem. Even a prepolymer having a low degree (n) of polymerization (e.g., a prepolymer having an n value of from about 15 to about 20) has an extremely high melt viscosity and, hence, it is difficult to effectively facilitate the surface renewal of the prepolymer by usual agitation. Therefore, separation of an aromatic monohydroxy compound (such as phenol) from the surface of the polymerization reaction mixture does not occur, so that it becomes impossible to produce an aromatic polycarbonate having a high degree of polymerization (e.g., an n value of about 30 to about 65) which is required of an aromatic polycarbonate product for practical use. This problem is well known in the art.

Various polymerizers have been known for use in producing aromatic polycarbonates by the melt transesterification process. A vertical agitation type polymerizer equipped with an agitator is widely used for a small scale production in a laboratory. The vertical agitation type polymerizer equipped with an agitator is advantageous in that it exhibits high volumetric efficiency and has a simple construction, so that polymerization on a small scale can be efficiently carried out. However, when it is intended to use the vertical agitation type polymerizer for the production of an aromatic polycarbonate on a commercial scale, the following serious problem arises. When it is intended to use the vertical agitation type polymerizer for the commercial scale production of an aromatic polycarbonate, it is virtually impossible to effectively agitate the polymerization reaction mixture. Therefore, as mentioned above, it becomes difficult to efficiently remove an aromatic monohydroxy compound produced (such as phenol) from the polymerization reaction system, so that an aromatic polycarbonate having a desired degree of polymerization cannot be produced.

Specifically, a large-scale vertical agitation type polymerizer generally has a greater ratio of the liquid volume to the vaporization area than a small-scale one. In other words, the depth of a reaction mixture in the agitation type polymerizer is large and, hence, the pressure in the lower part of the agitation type polymerizer is high. In such a case, even if the degree of vacuum of the polymerization reaction zone is increased in order to achieve a high degree of polymerization, the polymerization proceeds in the lower part of the agitation type polymerizer under high pressure due to the weight of the reaction mixture, so that an aromatic monohydroxy compound (such as phenol) cannot be efficiently removed. Therefore, a large-scale vertical agitation type polymerizer is usable only in the production of a prepolymer having a low degree of polymerization. For obtaining a polymer having a desired degree of polymerization, it is necessary to subject the prepolymer having a low degree of polymerization obtained by using the agitation type polymerizer to a further polycondensation by another polymerizer.

For solving the above-mentioned problem, various attempts have been made to remove an aromatic monohydroxy compound (such as phenol) from a high viscosity polymer being formed. Most of these attempts are concerned with improvement in mechanical agitation. For example, there are known a method using a screw type polymerizer device having a vent (see Examined Japanese Patent Application Publication No. Sho 50-19600 (corresponding to GB-1007302)); a method using an intermeshing twin-screw type extruder (see Examined Japanese Patent Application Publication No. Sho 52-36159); a method using a wiped film evaporation type reactor, such as a screw evaporator or a centrifugal film evaporator (see Examined Japanese Patent Application Publication No. Sho 53-5718 (corresponding to U.S. Pat. No. 3,888,826)); and a method using a combination of a wiped film evaporation type apparatus and a horizontal agitation type polymerizer (see Unexamined Japanese Patent Application Laid-Open Specification No. Hei 2-153923).

However, each of the above-mentioned methods mainly uses the technique of mechanical agitation and, hence, inevitably has a limitation accompanying the technique, so that it is impossible to completely solve the above-mentioned problem. Specifically, it is difficult to satisfactorily agitate a polymer having an extremely high viscosity by mechanical agitation and, hence, various problems encountered in the production of an aromatic polycarbonate from a prepolymer having an extremely high viscosity cannot be solved. On this point, a detailed explanation is given below.

In the above-mentioned method, it is attempted to lower the melt viscosity of the prepolymer as much as possible by elevating the temperature of the prepolymer. Specifically, the polymerization of the prepolymer is performed at a high temperature which is close to 300° C. under high vacuum while mechanically agitating the prepolymer so as to effect the surface renewal of the prepolymer. However, even at such a high temperature, the melt viscosity of the prepolymer is still very high, so that it is impossible to satisfactorily effect the surface renewal of the prepolymer. Therefore, by this method, the increase in the polymerization degree of the aromatic polycarbonate is inevitably limited and, hence, it is impossible to obtain a high molecular weight aromatic polycarbonate. Further, the method has the following disadvantage. Since the method is practiced at a high temperature which is close to 300° C., it is likely that the polymer produced suffers discoloration and lowering of properties. Further, it is likely that discoloration and lowering of properties of the polymer are also caused due to entrance of air and foreign matter into the polymerizer device through the vacuum-sealed gap between the casing of the polymerizer device and the rotary axis of an agitator. Therefore, when it is intended to stably produce, by the method using mechanical agitation, a high quality aromatic polycarbonate for a long period of time, it is still necessary to solve various problems.

It is also practiced to use an inert gas in the production of an aromatic polycarbonate. That is, it is widely known to effect a polymerization in an atmosphere of an inert gas in the production of aromatic polycarbonates by the melt transesterification process using any of the above-mentioned polymerizer devices, such as the vertical agitation type polymerizer vessel, the intermeshing twin-screw extruder and the wiped film evaporation type reactor. For example, U.S. Pat. Nos. 2,964,297 and 3,153,008 describe a method in which the production of an aromatic polycarbonate by the melt transesterification process is performed under reduced pressure in an atmosphere of an inert gas, wherein the inert gas is introduced into a polymerizer device in a small amount, relative to the amount of the aromatic polycarbonate to be produced. However, by this method, it is virtually impossible to elevate the polymerization rate. In the method, the inert gas is used only for preventing discoloration of the aromatic polycarbonate which is caused by an oxidative secondary reaction occurring at high temperatures.

Moreover, there is also known a method in which an inert gas is used in a large amount for removing, from the polymerization reaction system, an aromatic monohydroxy compound (such as phenol) which is produced in the equilibrium polycondensation reaction for producing an aromatic polycarbonate. For example, Unexamined Japanese Patent Application Laid-Open Specification No. Hei 6-206997 (corresponding to U.S. Pat. No. 5,384,389) describes a method in which an aromatic polycarbonate is produced by performing the equilibrium polycondensation reaction while continuously introducing an inert gas, together with a molten oligocarbonate, into a heated polymerizer device under atmospheric pressure or under superatmospheric pressure in an amount of 1 m$^3$ or more per kg of the oligocarbonate, and removing phenol or the like (which is produced in the equilibrium polycondensation reaction) in such a form as entrained by the inert gas. However, the method in which the production of the aromatic polycarbonate is performed while using a large amount of the inert gas for removing phenol or the like from the reaction system in such a form as entrained by the inert gas has a problem in that, when it is intended to recycle the inert gas used in the polymerization reaction, it is necessary to separate the aromatic monohydroxy compound (such as phenol) from the inert gas by using a large separation apparatus.

On the other hand, Unexamined Japanese Patent Application Laid-Open Specification No. 6-248067 describes a method for producing an aromatic polycarbonate, which comprises producing a low molecular weight polycarbonate having a viscosity average molecular weight of from 1,000 to 25,000 in a first reaction zone, and polymerizing the produced low molecular weight polycarbonate in a second reaction zone to thereby obtain a final polycarbonate having a viscosity average molecular weight of from 10,000 to 50,000, wherein an inert gas is introduced into the first reaction zone and the second reaction zone in respective amounts of 0.01 to 20 and 0.002 to 10, each in terms of the weight ratio of the inert gas to the aromatic dihydroxy compound. Also in this method, the inert gas is used for removing the aromatic monohydroxy compound (such as phenol), which is produced in the equilibrium polycondensation reaction, from the reaction system in such a form as entrained by the inert gas, so that the inert gas is used in a large amount. Therefore, this method has the same problem as mentioned above in connection with Unexamined Japanese Patent Application Laid-Open Specification No. Hei 6-206997 (corresponding to U.S. Pat. No. 5,384,389).

Each of the above-mentioned conventional methods has problems caused by the limited performance of the polymerizer device used. Specifically, the conventional methods have problems in that, for obtaining a desired aromatic polycarbonate, it is necessary to perform the reaction at a high temperature for a long period of time; in that the aromatic polycarbonate produced suffers heat deterioration due to a high temperature reaction performed for a long period of time and, hence, a high quality aromatic polycarbonate cannot be obtained; and in that it is difficult to perform a stable production of an aromatic polycarbonate for a period of time as long as several thousands hours. Therefore, each of the above-mentioned conventional methods is not suitable for the commercial scale production of an aromatic polycarbonate.

The present inventors completely solved the above-mentioned problems by developing methods which do not use mechanical agitation. Specifically, the present inventors developed methods using a guide-wetting fall polymerizer device in which a molten prepolymer is allowed to fall along and in contact with the surface of a guide, such as a wire, thereby effecting polymerization of the molten prepolymer to produce a desired polymer (see U.S. Pat. No. 5,589,564, Unexamined Japanese Patent Application Laid-Open Specification No. Hei 8-225641, Unexamined Japanese Patent Application Laid-Open Specification No. Hei 8-225643, Unexamined Japanese Patent Application Laid-Open Specification No. Hei 8-325373, WO97/22650, Unexamined Japanese Patent Application Laid-Open Specification No. Hei 10-81741, Unexamined Japanese Patent Application Laid-Open Specification No. Hei 10-298279, WO99/36457, and WO99/64492).

For example, in the above-mentioned U.S. Pat. No. 5,589,564 disclosing a method which has been developed by the present inventors and in which the polymerization of a prepolymer is conducted by allowing the prepolymer to pass downwardly through a perforated plate and fall along and in contact with the surface of a guide, it is described that a colorless, high quality polycarbonate can be produced at a high polymerization rate. In the Working Examples of this patent document, a small amount of an inert gas is introduced into the polymerizer device. Further, in the above-mentioned Unexamined Japanese Patent Application Laid-Open Specification No. Hei 8-325373, the present inventors proposed a method in which the polymerization of a prepolymer is conducted by allowing the prepolymer to fall along and in contact with the surface of a guide, wherein the ratio of the partial pressure of the aromatic monohydroxy compound contained in the inert gas to the partial pressure of the inert gas, is controlled within such a specific range that the recovery of the inert gas can be conducted even without using a large apparatus. Further, in the above-mentioned WO99/64492, the present inventors proposed a method in which the polymerization is performed under conditions wherein the pressure under which the inert gas is introduced and the polymerization pressure satisfy a specific relationship.

However, none of the above-mentioned patent documents has any teaching or suggestion about a method for efficiently producing an aromatic polycarbonate on a commercial scale at a rate of 1 t/hr. Further, it has been found that, even when the relatively small scale polymerizer devices disclosed in the above-mentioned patent documents are used for producing an aromatic polycarbonate for a long period of time, it is possible that the resultant aromatic polycarbonate product sometimes contain a very small mass (having a size of 1 mm or less) of a polymer having too high a molecular weight. Therefore, it has been desired to provide a method for stably and efficiently producing a very high quality aromatic polycarbonate on a commercial scale at a rate of 1 t/hr or more for a period of time as long as several thousand hours or more (for example, as long as 5,000 hours or more).

DISCLOSURE OF THE INVENTION

Task to Be Solved by the Invention

It is a task of the present invention to provide a method for producing a high performance, high quality aromatic polycarbonate (which not only is colorless but also has excellent mechanical properties) from a molten aromatic polycarbonate prepolymer obtained by reacting an aromatic dihydroxy compound with a diaryl carbonate, wherein the polycarbonate can be stably and efficiently produced on a commercial scale at a rate of 1 t/hr or more for a long period of time, while maintaining the molecular weight of the aromatic polycarbonate at a desired level.

Means to Solve the Task

The present inventors have made extensive and intensive studies with a view toward developing a method for stably and efficiently producing, from the above-mentioned molten aromatic polycarbonate prepolymer, a high quality, high performance aromatic polycarbonate, which not only is colorless but also has excellent mechanical properties, at a rate of 1 t/hr or more for a long period of time (for example, a period of time as long as 5,000 hours), wherein the molecular weight of the aromatic polycarbonate can be maintained at a desired level. In their studies, the present inventors have focused on improving the guide-wetting fall polymerizer devices which were already proposed by the present inventors. As a result, it has unexpectedly been found that, by the combined use of a molten aromatic polycarbonate prepolymer having absorbed therein a specific amount of an inert gas and a guide-wetting fall polymerizer device having a specific structure, a high quality, high performance aromatic polycarbonate which not only is colorless but also has excellent mechanical properties can be stably and efficiently produced on a commercial scale at a rate of 1 t/hr or more for a long period of time (for example, a period of time as long as 5,000 hours), wherein the molecular weight of the aromatic polycarbonate can be maintained at a desired level. Based on this finding, the present invention has been completed.

Accordingly, it is an object of the present invention to provide a method for efficiently producing, from a molten aromatic polycarbonate prepolymer obtained by reacting an aromatic dihydroxy compound with a diaryl carbonate, a high quality aromatic polycarbonate which not only is colorless but also has excellent mechanical properties, at a rate of 1 t/hr or more, stably for a long period of time, wherein the molecular weight of the aromatic polycarbonate can be maintained at a desired level.

The foregoing and other objects, features and advantages of the present invention will be apparent from the following detailed description taken in connection with the accompanying drawings and the appended claims.

EFFECT OF THE INVENTION

The method of the present invention for producing an aromatic polycarbonate has solved various problems accompanying the above-mentioned phosgene process utilizing an interfacial polycondensation between an aromatic dihydroxy compound and phosgene. For example, the method of the present invention is free from the problem that highly poisonous phosgene is used in a large amount; the problem that methylene chloride is used as a solvent in a large amount; the problem that a reaction apparatus is likely to be corroded with chlorine-containing compounds, such as by-produced hydrogen chloride, by-produced sodium chloride, and methylene chloride used as a solvent; and the problem that difficulties are encountered in separating and removing chlorine-containing impurities (such as sodium chloride and residual methylene chloride), which adversely affect properties of the aromatic polycarbonate produced. Further, the method of the present invention has solved the above-mentioned problems accompanying the melt transesterification process. For example, the method of the present invention is free from the problem that, as the polymerization proceeds, the viscosity of a polymer being formed increases during the progress of the polymerization reaction and, hence, it becomes difficult to efficiently remove phenol or the like from the polymerization reaction system, thus making it difficult to achieve a high degree of polymerization with respect to a polycarbonate produced. By the method of the present invention, a high quality aromatic polycarbonate which not only is colorless but also has excellent mechanical properties can be stably and efficiently produced on a commercial scale at a high rate of 1 t/hr or more for a long period of time, wherein the molecular weight of the aromatic polycarbonate can be maintained at a desired level. Therefore, the method of the present invention can be very advantageously employed for the commercial scale production of an aromatic polycarbonate.

BRIEF DESCRIPTION OF THE DRAWINGS

FIG. 1 is a schematic view of a preferred example of an apparatus which can be used in the present invention as the guide-wetting fall polymerizer device or the inert gas absorption device.

FIG. 2 is a schematic view of a preferred example of an apparatus which can be used in the present invention as the guide-wetting fall polymerizer device or the inert gas absorption device, in each of which the upper portion of the casing is cylindrical and the lower tapered portion of the casing is reverse conical. The methods for measuring the inner diameter (D) of the upper portion of the casing, the length (L) of the upper portion of the casing, the inner diameter (d) of the outlet, and the length (h) of the guide are shown.

DESCRIPTION OF REFERENCE NUMERALS

Figure 1:
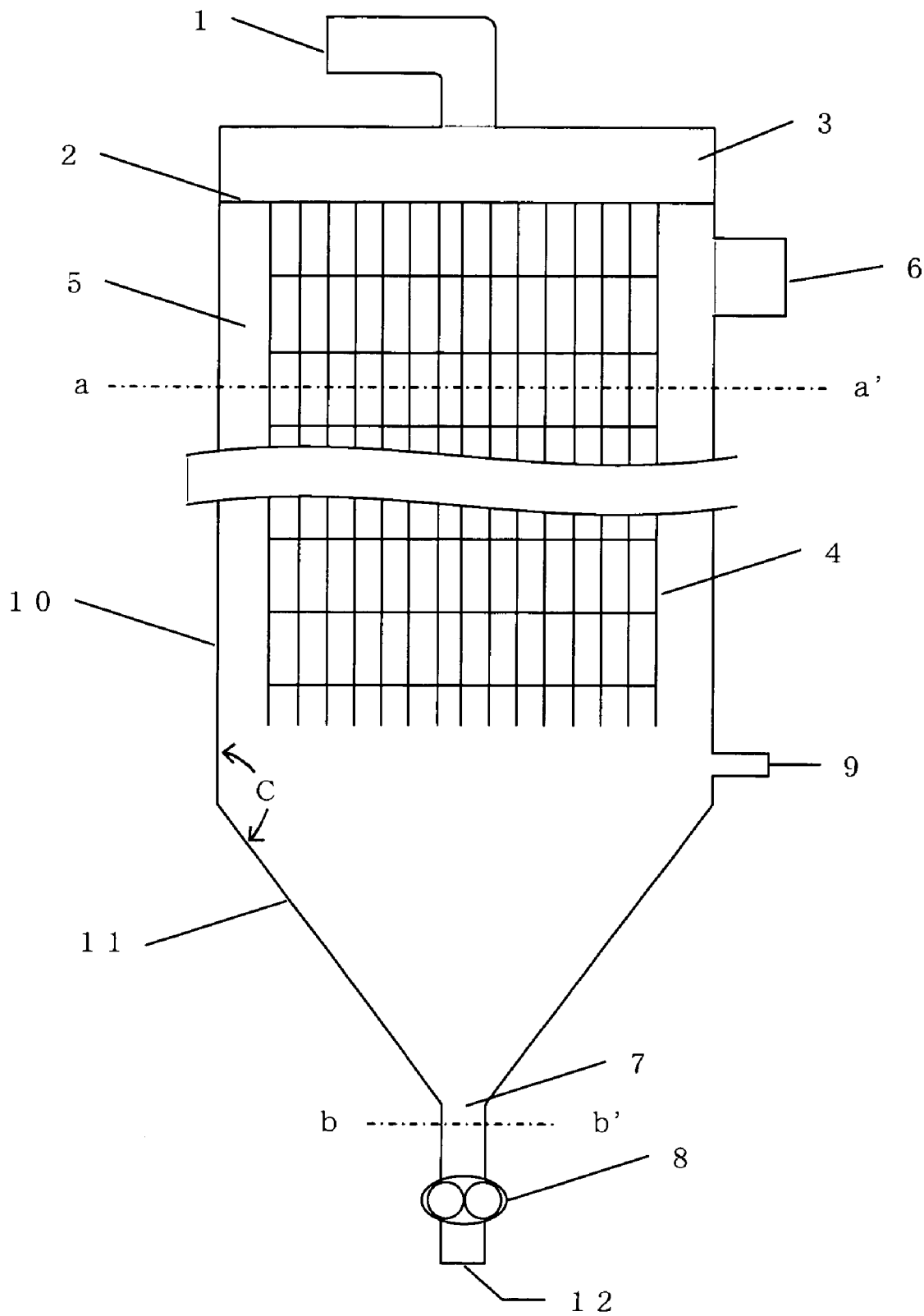
[FIG. 1]

1: Inlet for a molten prepolymer
2: Distribution plate
3: Molten prepolymer feeding zone
4: Guide
5: Polymerization reaction zone (when the device is used as a polymerization device) or inert gas absorption zone (when the device is used as an inert gas absorption device)
6: Vent, which, if desired, is used as a vacuum vent
7: Outlet for a molten prepolymer or aromatic polycarbonate
8: Discharge pump for a molten prepolymer or aromatic polycarbonate
9: Inlet for an inert gas (when the device is used as a polymerization device)
10: Upper portion of the polymerization reaction zone of the casing (when the device is used as a polymerization device) or upper portion of the inert gas absorption zone of the casing (when the device is used as an inert gas absorption device)
11: Lower tapered portion of the polymerization reaction zone of the casing (when the device is used as a polymerization device) or lower tapered portion of the inert gas absorption zone of the casing (when the device is used as an inert gas absorption device)
12: Discharge port for withdrawal of a molten prepolymer or aromatic polycarbonate

BEST MODE FOR CARRYING OUT THE INVENTION

According to the present invention, there is provided:

1. A method for efficiently producing an aromatic polycarbonate, which comprises the following steps (I) to (III):

(I) treating a molten aromatic polycarbonate prepolymer, obtained by reacting an aromatic dihydroxy compound with a diaryl carbonate, with an inert gas to thereby cause the molten prepolymer to absorb the inert gas, thereby obtaining an inert gas-absorbed molten prepolymer, wherein the amount of the inert gas absorbed in the molten prepolymer is from 0.0001 to 1 N liter per kg of the molten aromatic polycarbonate prepolymer, wherein the N liter means the volume in terms of liter or liters as measured under the normal temperature and pressure conditions, (II) feeding the inert gas-absorbed molten prepolymer into a guide-wetting fall polymerizer device (a), the guide-wetting fall polymerizer device (a) comprising:

a casing having an inlet for the inert gas-absorbed molten prepolymer, an inert gas-absorbed molten prepolymer feeding zone positioned subsequent to and communicating with the inlet, a polymerization reaction zone positioned subsequent to and communicating with the inert gas-absorbed molten prepolymer feeding zone, and an outlet, for an aromatic polycarbonate, positioned subsequent to and communicating with the polymerization reaction zone, an evacuation device provided in association with the polymerization reaction zone of the casing, and a withdrawal device provided in association with the outlet of the casing, the polymerization reaction zone having a space which has a guide securely held therein and extending downwardly therethrough, the polymerization reaction zone being separated from the inert gas-absorbed molten prepolymer feeding zone through a distribution plate having a plurality of holes, through which the inert gas-absorbed molten prepolymer feeding zone communicates with the polymerization reaction zone, and (III) allowing the inert gas-absorbed molten aromatic polycarbonate prepolymer to fall along and in contact with the surface of the guide in the polymerization reaction zone, thereby effecting polymerization of the inert gas-absorbed molten prepolymer to produce an aromatic polycarbonate, wherein the casing in the guide-wetting fall polymerizer device (a) has, at its polymerization reaction zone, an upper portion defined by an upper peripheral side wall and a lower tapered portion defined by a lower peripheral wall which is inclined toward the outlet and continuously extends downwardly from the upper peripheral side wall, the lower tapered portion having the outlet at the bottom thereof, so that the produced aromatic polycarbonate falling off from the guide flows down on the inner surface of the lower peripheral wall of the lower tapered portion to the outlet, wherein the guide-wetting fall polymerizer device (a) has the following characteristics (1) to (5):

(1) the opening area (A) (m$^2$) of the horizontal cross section of the upper portion of the casing satisfies the following formula:

$$0.7 \leq A \leq 200;$$

(2) the guide-wetting fall polymerizer device (a) satisfies the following formula:

$$20 \leq A/B \leq 1,000$$

wherein A is as defined above for the characteristic (1) and B represents a minimum opening area (m$^2$) of the cross section of the outlet;

(3) the angle (C) (°) between the upper peripheral side wall of the upper portion and the inner surface of the lower peripheral wall of the lower tapered portion, as measured with respect to a vertical cross section of the casing, satisfies the following formula:

$$120 \leq C \leq 165;$$

(4) the length (h) (cm) of the guide satisfies the following formula:

$$150 \leq h \leq 3,000; \text{ and}$$

(5) the total outer surface area (S1) (m²) of the guide satisfies the following formula:

$$2 \leq S1 \leq 5,000, \text{ and}$$

wherein the aromatic polycarbonate is produced at a rate of 1 t/hr or more.

Further, the present invention also provides:

2. The method according to item 1 above, wherein the upper portion of the casing is cylindrical, the lower tapered portion of the casing is reverse conical, and the outlet is cylindrical, wherein the inner diameter (D) (cm) of the upper portion, the length (L) (cm) of the upper portion, the inner diameter (d) (cm) of the outlet and the length (h) (cm) of the guide satisfy the following formulae:

$$100 \leq D \leq 1,000,$$

$$5 \leq D/d \leq 50,$$

$$0.5 \leq L/D \leq 30, \text{ and}$$

$$h-20 \leq L \leq h+300.$$

3. The method according to item 1 or 2 above, wherein the guide is columnar, and the diameter (r) (cm) of the guide satisfies the following formula:

$$0.1 \leq r \leq 1.$$

4. The method according to any one of items 1 to 3 above, wherein the guide-wetting fall polymerizer device (a) has connected thereto at least one additional guide-wetting fall polymerizer device (b), the at least one additional guide-wetting fall polymerizer device (b) having the characteristics (1) to (5), with the proviso that when a plurality of additional guide-wetting fall polymerizer devices (b) are used, the polymerizer devices (b) are connected in series, and wherein the steps (II) and (III) are performed in the at least one additional guide-wetting fall polymerizer device (b) to thereby increase the polymerization degree of the aromatic polycarbonate produced in the guide wetting fall polymerizer device (a).

5. The method according to item 4 above, wherein the guide-wetting fall polymerizer device (a) has one additional guide-wetting fall polymerizer device (b) connected thereto, and wherein the total outer surface area (S1) (m²) of the guide used in the guide-wetting fall polymerizer device (a) and the total outer surface area (S2) (m²) of the guide used in the additional guide-wetting fall polymerizer device (b) satisfy the following formula:

$$1 \leq S1/S2 \leq 20.$$

6. The method according to item 5 above, wherein the aromatic polycarbonate produced in the guide-wetting fall polymerizer device (a) is treated with an inert gas to thereby cause the aromatic polycarbonate to absorb the inert gas prior to the feeding of the aromatic polycarbonate into the additional guide-wetting fall polymerizer device (b).

7. An aromatic polycarbonate produced by the method of any one of items 1 to 6 above.

8. The aromatic polycarbonate according to item 7 above, which has a halogen atom content of 10 ppb or less, and contains at least one metal compound selected from the group consisting of an alkali metal compound and an alkaline earth metal compound in an amount of from 0.001 to 1 ppm in terms of the total content of alkali metal atoms and alkaline earth metal atoms.

9. The aromatic polycarbonate according to item 7 above, which has a halogen atom content of 5 ppb or less, and contains at least one metal compound selected from the group consisting of an alkali metal compound and an alkaline earth metal compound in an amount of from 0.005 to 0.5 ppm in terms of the total content of alkali metal atoms and alkaline earth metal atoms.

10. The aromatic polycarbonate according to item 7 above, which has a halogen atom content of 1 ppb or less, and contains at least one metal compound selected from the group consisting of an alkali metal compound and an alkaline earth metal compound in an amount of from 0.01 to 0.1 ppm in terms of the total content of alkali metal atoms and alkaline earth metal atoms.

11. The aromatic polycarbonate according to any one of items 7 to 10 above, which comprises a plurality of aromatic polycarbonate main chains, wherein the plurality of aromatic polycarbonate main chains collectively have bonded thereto at least one side chain through a heterolinkage selected from the group consisting of an ester linkage and an ether linkage, and wherein the amount of the heterolinkage contained in the aromatic polycarbonate is from 0.05 to 0.5 mol %, per mol of carbonate linkages contained in the plurality of aromatic polycarbonate main chains.

Hereinbelow, the present invention is described in detail.

In the present invention, the terminology "aromatic dihydroxy compound" means a compound represented by the following formula:

HO—Ar—OH wherein Ar represents a divalent aromatic group.

Preferred examples of divalent aromatic groups (Ar groups) include a group represented by the following formula:

—Ar$^1$—Y—Ar$^2$— wherein each of Ar$^1$ and Ar$^2$ independently represents a divalent carbocyclic or heterocyclic aromatic group having 5 to 70 carbon atoms, and Y represents a divalent alkane group having 1 to 30 carbon atoms.

In the divalent carbocyclic or heterocyclic aromatic groups Ar$^1$ and Ar$^2$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group. Preferred examples of heterocyclic aromatic groups Ar$^1$ and Ar$^2$ include an aromatic group having at least one hetero atom, such as a nitrogen atom, an oxygen atom or a sulfur atom. Examples of divalent aromatic groups Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above.

Examples of divalent alkane groups (Y groups) include organic groups respectively represented by the following formulae:

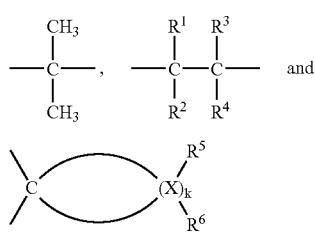

wherein each of R¹, R², R³ and R⁴ independently represents a hydrogen atom, an alkyl group having 1 to 10 carbon atoms, an alkoxy group having 1 to 10 carbon atoms, a cycloalkyl group having 5 to 10 ring-forming carbon atoms, a carbocyclic aromatic group having 5 to 10 ring-forming carbon atoms or a carbocyclic aralkyl group having 6 to 10 ring-forming carbon atoms; k represents an integer of from 3 to 11; each X represents a carbon atom and has R⁵ and R⁶ bonded thereto; each R⁵ independently represents a hydrogen atom or an alkyl group having 1 to 6 carbon atoms, and each R⁶ independently represents a hydrogen atom or an alkyl group having 1 to 6 carbon atoms, wherein R⁵ and R⁶ are the same or different; and wherein, in each of R¹, R², R³, R⁴, R⁵ and R⁶, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Specific examples of divalent aromatic groups (Ar groups) include groups respectively represented by the following formulae:

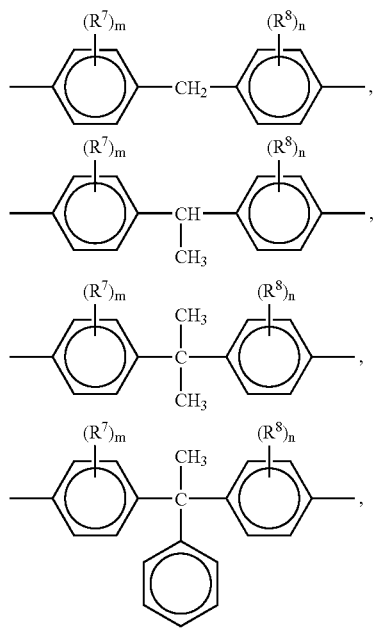

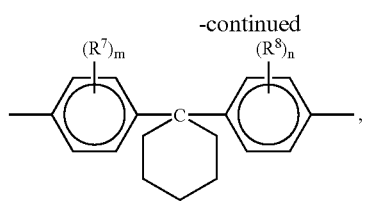

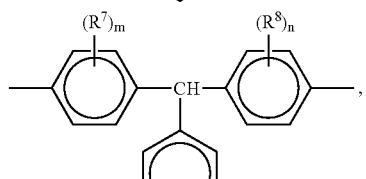

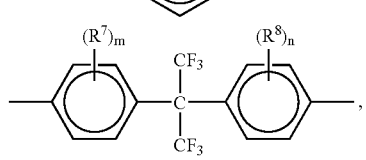

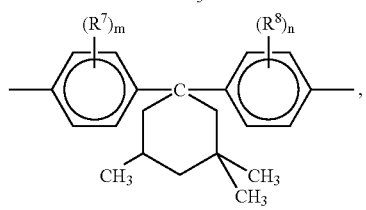

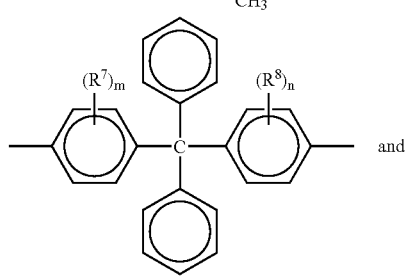

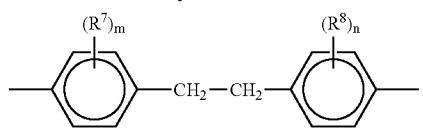

wherein each of R⁷ and R⁸ independently represents a hydrogen atom, a halogen atom, an alkyl group having 1 to 10 carbon atoms, an alkoxy group having 1 to 10 carbon atoms, a cycloalkyl group having 5 to 10 ring-forming carbon atoms, or a phenyl group; each of m and n independently represents an integer of from 1 to 4, with the proviso that when m is an integer of from 2 to 4, the R⁷'s are the same or different, and when n is an integer of from 2 to 4, the R⁸'s are the same or different.

Further examples of divalent aromatic groups (Ar groups) include a group represented by the following formula:

—Ar¹-Z-Ar²— wherein Ar¹ and Ar² are as defined above; and Z represents a single bond or a divalent group, such as —O—, —CO—, —S—, —SO₂—, —SO—, —COO—, or —CON(R¹)—, wherein R¹ is as defined above.

Specific examples of such divalent aromatic groups (Ar groups) include groups respectively represented by the following formulae:

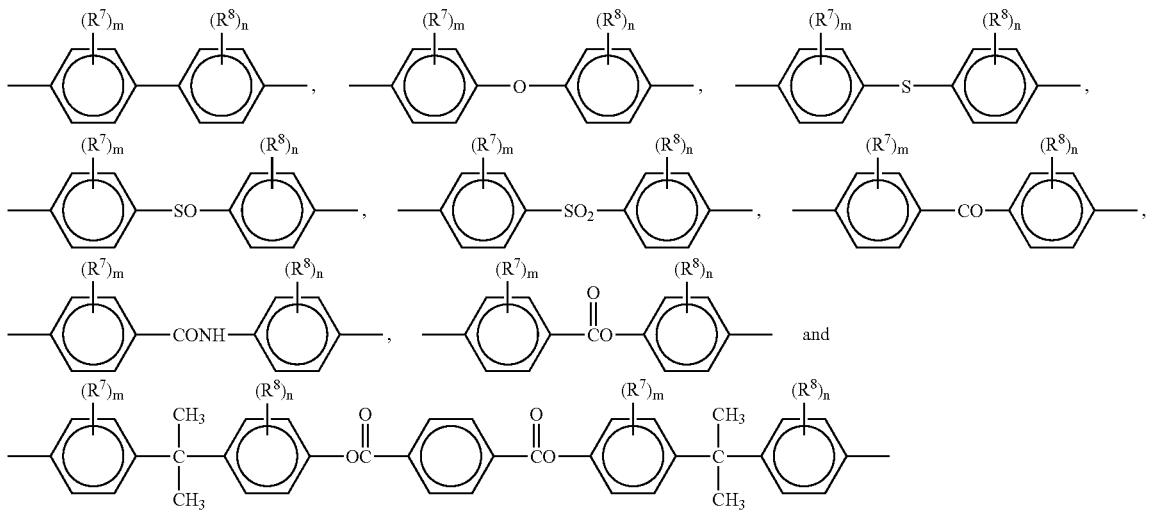

wherein R[7], R[8], m and n are as defined above.

Further specific examples of divalent aromatic groups (Ar groups) include an unsubstituted or substituted phenylene group, an unsubstituted or substituted naphthylene group, and an unsubstituted or substituted pyridylene group.

In the method of the present invention, the aromatic dihydroxy compounds can be used individually or in combination. Representative examples of aromatic dihydroxy compounds include bisphenol A. In the method of the present invention, a trivalent aromatic trihydroxy compound can be used for the purpose of introducing a branched structure into the aromatic polycarbonate, so long as the desired effects of the present invention can be achieved.

The diaryl carbonate used in the present invention is represented by the following formula:

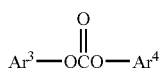

wherein each of Ar[3] and Ar[4] independently represents a monovalent aromatic group having 5 to 20 carbon atoms.

In each of Ar[3] and Ar[4], which independently represents a monovalent carbocyclic or heterocyclic aromatic group, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group. Ar[3] and Ar[4] are the same or different. Representative examples of monovalent aromatic groups Ar[3] and Ar[4] include a phenyl group, a naphthyl group, a biphenyl group and a pyridyl group. These groups may or may not be substituted with the above-mentioned substituent or substituents.

Preferred examples of monovalent aromatic groups Ar[3] and Ar[4] include those which are respectively represented by the following formulae:

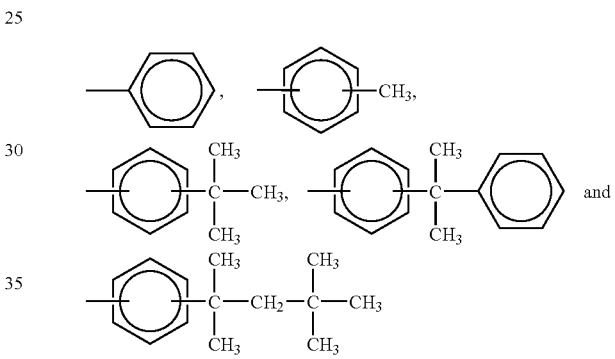

Representative examples of diaryl carbonates include an unsubstituted or substituted diphenyl carbonate compound represented by the following formula:

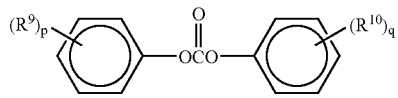

wherein each of R[9] and R[10] independently represents a hydrogen atom, an alkyl group having 1 to 10 carbon atoms, an alkoxy group having 1 to 10 carbon atoms, a cycloalkyl group having 5 to 10 ring-forming carbon atoms or a phenyl group; each of p and q independently represents an integer of from 1 to 5, with the proviso that when p is an integer of 2 or more, the R[9]'s are the same or different, and when q is an integer of 2 or more, the R[10]'s are the same or different.

Of these diaryl carbonates, preferred are diaryl carbonates having a symmetrical configuration, such as (unsubstituted) diphenyl carbonate and a diphenyl carbonate substituted with a lower alkyl group, e.g., ditolyl carbonate and di-tert-butylphenyl carbonate. Especially preferred is diphenyl carbonate, which is the diaryl carbonate having the simplest structure.

These diaryl carbonates can be used individually or in combination.

The ratio (i.e., charging ratio) of the aromatic dihydroxy compound to the diaryl carbonate may vary depending on the types of the aromatic dihydroxy compound and diaryl carbonate employed, and the polymerization conditions (such as a polymerization temperature). The diaryl carbonate is generally used in an amount of from 0.9 to 2.5 mol, preferably from 0.95 to 2.0 mol, more preferably from 0.98 to 1.5 mol, per mol of the aromatic dihydroxy compound.

In the present specification, the "molten aromatic polycarbonate prepolymer" (hereinafter, frequently referred to simply as "molten prepolymer") obtained by reacting an aromatic dihydroxy compound with a diaryl carbonate means a molten low molecular weight aromatic polycarbonate having a polymerization degree which is being increased by the reaction and has not yet reached a desired level. Needless to say, such a molten prepolymer may be an oligomer. With respect to the average degree of polymerization of the molten aromatic polycarbonate prepolymer used in the present invention, there is no particular limitation so long as the molten prepolymer can be polymerized at the polymerization temperature. The average degree of polymerization of the molten prepolymer varies depending on the chemical structure thereof; however, the average degree of polymerization of the molten prepolymer is generally 2 to 2,000.

The molten prepolymer used in the present invention as a starting material for producing the aromatic polycarbonate can be obtained by any conventional methods.

In the method of the present invention, the thus obtained molten prepolymer is treated with an inert gas to thereby cause the molten prepolymer to absorb a specific amount of the inert gas (specifically, the amount of the inert gas absorbed in the molten prepolymer is from 0.0001 to 1 N liter per kg of the molten aromatic polycarbonate prepolymer, wherein the N liter means the volume in terms of liter or liters as measured under the normal temperature and pressure conditions). The resultant inert gas-absorbed molten prepolymer having absorbed therein a specific amount of the inert gas is fed to a guide-wetting fall polymerizer device having a specific structure, and polymerization of the inert gas-absorbed molten prepolymer is effected. In the present invention, the combined use of an inert gas-absorbed molten prepolymer and a guide-wetting fall polymerizer device having a specific structure is important.

In the present invention, the expression "a molten prepolymer is treated with an inert gas" means that the molten prepolymer is caused to absorb the inert gas under conditions wherein the polymerization of the molten prepolymer hardly proceeds. Hereinafter, the step (i.e., step (I)) in which the molten prepolymer is treated with the inert gas is frequently referred to as the "inert gas absorption step".

With respect to the method for treating the molten prepolymer with an inert gas, there is no particular limitation so long as the absorption of the inert gas into the molten prepolymer is performed under conditions wherein the polymerization of the molten prepolymer hardly proceeds. The treatment of the molten prepolymer with the inert gas can be performed, for example, by the use of an inert gas absorption device.

In the present invention, the amount of the inert gas absorbed in the molten prepolymer is generally in the range of from 0.0001 to 1 N liter, preferably from 0.001 to 0.8 N liter, more preferably from 0.005 to 0.6 N liter, per kg of the molten prepolymer, wherein the "N liter" means the volume in terms of liter or liters as measured under the normal temperature and pressure conditions. When the amount of the inert gas absorbed in the molten prepolymer is smaller than 0.0001 N liter per kg of the molten prepolymer, the effect of increasing the polymerization rate and the effect of the stable production of an aromatic polycarbonate are likely to become unsatisfactory. Further, in the method of the present invention, the amount of the inert gas absorbed in the molten prepolymer need not be larger than 1 N liter per kg of the molten prepolymer. The present inventors have found that, by polymerizing the molten prepolymer having absorbed therein an inert gas in the above-mentioned amount by the use of the specific guide-wetting fall polymerizer device employed in the present invention, not only is the effect of increasing the polymerization rate remarkable, but also the desired aromatic polycarbonate can be stably and efficiently produced for a long period of time, wherein the molecular weight of the aromatic polycarbonate can be maintained at a desired level.

Generally, the amount of the inert gas absorbed in the molten prepolymer can be easily determined by directly determining the amount of the inert gas fed to the inert gas absorption device. For example, when the molten prepolymer is caused to absorb the inert gas while flowing the inert gas through the inert gas absorption device, the amount of the inert gas absorbed in the molten prepolymer can be obtained as the difference between the amount of the inert gas fed to the device and the amount of the inert gas discharged from the device. Alternatively, when a predetermined amount of the molten prepolymer is fed to the inert gas absorption device containing the inert gas having a predetermined pressure, the amount of the inert gas absorbed in the molten prepolymer can be obtained from the decrease in pressure in the inert gas absorption device, which is caused by the absorption of the inert gas into the molten prepolymer. These methods can be employed either in the case where the inert gas absorption is conducted in a batchwise manner in which a predetermined amount of the molten prepolymer is batchwise fed to the polymerizer device, or in the case where the inert gas absorption is conducted in a continuous manner in which the molten prepolymer is continuously fed to the inert gas absorption device and the resultant molten prepolymer having the inert gas absorbed therein is continuously withdrawn from the device.

Each of the above-mentioned conventional methods for producing an aromatic polycarbonate, in which it is intended to elevate the polymerization rate by the use of an inert gas for removing an aromatic monohydroxy compound (such as phenol) in such a form as entrained by the inert gas, is a method in which an inert gas is fed in a relatively large amount to a polymerization device. However, it has surprisingly been found that, in the method of the present invention in which the molten prepolymer is caused to absorb an inert gas by using an inert gas absorption device and the resultant molten prepolymer having absorbed therein a specific amount of the inert gas is polymerized by the specific polymerization device, not only is the polymerization rate very high as compared to those of the above-mentioned conventional methods in which an inert gas is fed to a polymerizer device, but also it becomes possible to produce an aromatic polycarbonate very stably on a commercial scale at a rate of 1 t/hr or more for a long period of time (for example, as long as 5,000 hours) without fluctuation of the molecular weight of the aromatic polycarbonate.

With respect to the conventional method in which an inert gas is continuously fed to a polymerizer device, the reason why the polymerization rate is improved in the conventional method is considered as follows. The transesterification reaction is an equilibrium reaction in which an aromatic monohydroxy compound (such as phenol) is produced. Therefore, it is considered that, by removing from the reaction system the aromatic monohydroxy compound in such a form as entrained by the inert gas, the partial pressure of the aromatic monohydroxy compound is lowered, so that the equilibrium of the reaction is displaced toward the desired product system to thereby improve the polymerization rate. However, in the conventional method, for improving the polymerization rate, it is necessary to use an inert gas in a large amount. Therefore, the conventional method inevitably has various problems accompanying the use of a large amount of an inert gas (such as a problem concerning the recovery and recycle of the inert gas).

On the other hand, in the present invention, the polymerization rate is remarkably improved despite the fact that an inert gas is used only in a small amount, which is virtually not effective for lowering the partial pressure of the aromatic monohydroxy compound. The reason for the improvement in the polymerization rate in the method of the present invention cannot be explained by the mechanism whereby the inert gas used in the conventional method improves the polymerization rate. It has surprisingly been found that, when a molten prepolymer having absorbed therein a specific amount of an inert gas is subjected to polymerization using the specific polymerizer device used in the present invention, continuous foaming vigorously occurs from the surface of the molten prepolymer in the polymerization reaction zone of the polymerizer device. It is presumed that the continuous foaming has the following effects. The continuous foaming greatly facilitates spontaneous agitation of the molten prepolymer and increase the frequency at which collision occurs between the molecules of the prepolymers in the inside and surface of the molten prepolymer, thereby increasing the polymerization reaction rate. Further, the continuous foaming greatly facilitates the surface renewal of the molten prepolymer falling along and in contact with the guide in the polymerization reaction zone, thereby increasing the rate at which the aromatic monohydroxy compound is removed from the reaction system. As a result, the polymerization rate of the prepolymer can be greatly improved.

It has also unexpectedly been found that the method of the present invention is advantageous over the above-mentioned conventional method (in which an inert gas is fed into the polymerizer device to efficiently remove the aromatic monohydroxy compound) in that an aromatic polycarbonate which has excellent mechanical properties can be stably produced for a long period of time without fluctuation of the molecular weight of the aromatic polycarbonate. The reason for this also has not yet been elucidated, but is presumed as follows. In the method of the present invention, when a molten prepolymer is caused to absorb an inert gas using an inert gas absorption device, the inert gas is relatively uniformly dissolved in the molten prepolymer, so that the molten prepolymer is uniformly foamed in the polymerizer device, differing from the case of the conventional methods in which only non-uniform foaming of the molten prepolymer occurs during the polymerization thereof. It is presumed that such uniform foaming of the molten prepolymer enables the production of an aromatic polycarbonate having improved mechanical properties, wherein fluctuation of the molecular weight of the aromatic polycarbonate is suppressed.

Thus, the method of the present invention has solved all of the problems accompanying the conventional methods in which polymerization is performed while introducing an inert gas into the polymerization device.

In the method of the present invention, the molten prepolymer is treated with an inert gas to cause the molten prepolymer to absorb the inert gas under a predetermined pressure under conditions wherein the polymerization of the molten prepolymer hardly proceeds. The expression "the molten prepolymer is caused to absorb an inert gas" means that the inert gas is dispersed and/or dissolved in the molten prepolymer. The term "dispersed" used above indicates that the inert gas is present in the molten prepolymer in the form of bubbles to thereby form a gas-liquid mixed phase comprised of the molten prepolymer having the inert gas dispersed therein. The term "dissolved" used above indicates that the inert gas is present in such a form as intimately mixed with the molten prepolymer to thereby form a uniform liquid phase comprised of the molten prepolymer having the inert gas dissolved therein. In the method of the present invention, it is especially preferred that the inert gas is dissolved in the molten prepolymer. For efficiently dissolving the inert gas in the molten prepolymer, it is preferred to conduct the inert gas absorption step under conditions wherein the gas-liquid interface between the inert gas and the molten prepolymer is increased to thereby facilitate efficient contacting between the inert gas and the molten prepolymer, and/or conduct the inert gas absorption step under a pressure of an inert gas.

With respect to the type of the inert gas absorption device used in the present invention, there is no particular limitation so long as it can be used to cause the molten prepolymer to absorb the inert gas. Examples of inert gas absorption devices used in the method of the present invention include conventional devices described in "Kagaku Souchi Sekkei•Sousa Shiriizu No. 2, Kaitei Gasu Kyushu (Design and Operation of Chemical Devices, No. 2, Gas Absorption (Revised Version))", pp. 49-54 (published on Mar. 15, 1981 by Kagaku Kogyosha, Inc., Japan), such as a packed column type absorption device, a tray-containing column type absorption device, a spraying device-containing column type absorption device, a turbulent contact absorption device, a gas-liquid film cross-contacting type absorption device, a high-speed rotary flow type absorption device, and an absorption device utilizing mechanical force. Further, there can be used a device in which the molten prepolymer is allowed to fall along and in contact with the surface of a guide in an atmosphere of an inert gas to thereby cause the molten prepolymer to absorb the inert gas during the fall thereof. Alternatively, in the present invention, instead of using an inert gas absorption device, the inert gas absorption may be conducted by introducing the inert gas into a molten prepolymer which is present in a pipe for the introduction of the molten prepolymer into the polymerizer device, thereby causing the molten prepolymer to absorb the inert gas in the pipe. In the method of the present invention, it is especially preferred to use a spraying device-containing column type absorption device or a device in which the molten prepolymer is allowed to fall along and in contact with the surface of a guide in an atmosphere of an inert gas, thereby causing the molten prepolymer to absorb the inert gas during the fall thereof.

As the inert gas absorption device, it is especially preferred to use a device having the same structure as that of the guide-wetting fall polymerizer device used in method of the present invention. When such a device is used as an inert gas absorption device, the device does not function as a polymerizer device since the inert gas absorption device is effected under conditions wherein the polymerization of the molten prepolymer hardly proceeds. The use of such a device (having the same structure as that of the guide-wetting fall polymerizer device used in method of the present invention) (hereinafter, simply referred to as "guide-wetting fall absorption device") as an inert gas absorption device is advantageous in that the absorption of the inert gas into the molten prepolymer can be efficiently performed in a very short period of time. The reason for this is that the molten prepolymer which is falling along and in contact with the guide by the action of gravity has a very large surface area per weight and that the surface renewal and internal agitation of the molten prepolymer is effectively facilitated. Differing from the case of the guide-wetting fall polymerizer device, the difference in the melt viscosity of the molten prepolymer as between the upper portion and lower portion of the guide provided in the guide-wetting fall absorption device is very small, so that the device has the capability of treating a large amount of the prepolymer with an inert gas per hour. Therefore, generally, the guide-wetting fall absorption device may be smaller than the guide-wetting fall polymerizer device even when they have the same structure.

In the method of the present invention, it is preferred that the change in the number average molecular weight of the molten prepolymer in the inert gas absorption step is substantially smaller than 2,000, more advantageously 1,000 or less, still more advantageously 500 or less, wherein the change in the number average molecular weight is calculated by the formula: $M_2-M_1$, wherein $M_1$ and $M_2$ respectively represent the number average molecular weights of the molten prepolymer before and after the inert gas absorption step.

With respect to the temperature at which the prepolymer is caused to absorb the inert gas, there is no particular limitation so long as the prepolymer is in the molten state at the temperature. However, the temperature is generally in the range of from 150 to 350° C., preferably from 180 to 300° C., more preferably from 230 to 270° C.

In the method of the present invention, it is preferred that the pressure $P_g$ (unit: Pa) employed in the inert gas absorption step is the same as or higher than the reaction pressure employed for obtaining the molten prepolymer, i.e., the reaction pressure employed for reacting an aromatic dihydroxy compound with a diaryl carbonate to thereby obtain the molten aromatic polycarbonate prepolymer.

The above-mentioned pressure $P_g$ (unit: Pa) employed in the inert gas absorption step is higher than the pressure $P_p$ (unit: Pa) in the subsequent polymerization step. It is preferred that the pressure $P_g$ and the above-defined $M_1$ satisfy the following inequality:

$$P_g > 4 \times 10^{12} \times M_1^{-2.6871}$$

When the pressure $P_g$ (unit: Pa) does not satisfy the inequality above, the effect of increasing the polymerization rate and the effect of stable production are likely to become unsatisfactory. It is especially preferred that the pressure $P_g$ (unit: Pa) employed in the inert gas absorption step is atmospheric or higher, since the rate of the inert gas absorption by the molten prepolymer is increased and, hence, the inert gas absorption can be conducted by using a small device. There is no particular limitation with respect to the upper limit of the pressure $P_g$ (unit: Pa) employed in the inert gas absorption step; however the pressure $P_g$ (unit: Pa) is generally $2 \times 10^7$ Pa or less, preferably $1 \times 10^7$ Pa or less, more preferably $5 \times 10^6$ Pa or less.

Examples of methods for causing the molten prepolymer to absorb an inert gas by using an inert gas absorption device include a method in which most of the inert gas fed to the inert gas absorption zone is caused to be absorbed into the molten prepolymer, and a method in which a part of the inert gas fed to the inert gas absorption zone is caused to be absorbed into the molten prepolymer. Specific examples of the former method include a method using the above-mentioned spraying device-containing column type absorption device; a method using the above-mentioned device in which the molten prepolymer is allowed to fall along and in contact with the surface of a guide in an atmosphere of an inert gas to thereby cause the molten prepolymer to absorb the inert gas during the fall thereof, wherein the inert gas absorption is conducted while maintaining the internal pressure of the device at a predetermined level by supplementarily feeding the inert gas to the device in an amount which is substantially equal to the amount of the inert gas which has been absorbed in the molten prepolymer; and a method in which an inert gas is directly introduced into a molten prepolymer which is present in a pipe for the introduction of the molten prepolymer into the polymerizer device. Specific examples of the latter method include a method using the above-mentioned spraying device-containing column type absorption device, or a device in which the molten prepolymer is allowed to fall along and in contact with the surface of a guide to thereby cause the molten prepolymer to absorb the inert gas during the fall thereof, wherein the inert gas is fed to the device in a relatively large amount to thereby cause a part of the inert gas to be absorbed into the molten prepolymer, while withdrawing the remainder of the inert gas (which has not been absorbed into the molten prepolymer) from the device. Of the former and latter methods, the former method is preferred, because the amount of the inert gas needed in the former method is smaller than that needed in the latter method. Further, the inert gas absorption step can be conducted either in a continuous manner in which the molten prepolymer is continuously fed to the inert gas absorption device to thereby cause the molten prepolymer to absorb the inert gas, and the resultant molten prepolymer having the inert gas absorbed therein is continuously withdrawn from the device, or in a batchwise manner in which the molten prepolymer is batchwise fed to the inert gas absorption device to thereby cause the molten prepolymer to absorb the inert gas.

In the present invention, the term "inert gas" means a gas which has no reactivity with the molten aromatic polycarbonate prepolymer and is stable under the polymerization conditions. Specific examples of inert gases include nitrogen, argon, helium and carbon dioxide. Further examples of inert gases include organic compounds which are in a gaseous state at temperatures at which the aromatic polycarbonate prepolymer remains in the molten state, such as a gaseous lower hydrocarbon having 1 to 8 carbon atoms. Of the above-mentioned inert gases, nitrogen is especially preferred.

Hereinbelow, the guide-wetting fall polymerizer device used in the present invention is described in detail, with reference to FIGS. 1 and 2.

The guide-wetting fall polymerizer device (a) used in the present invention is a polymerizer device in which the molten aromatic polycarbonate prepolymer is allowed to fall along and in contact with the surface of a guide, thereby effecting polymerization of the molten prepolymer to produce an aromatic polycarbonate. The guide-wetting fall polymerizer device (a) comprises:

a casing having an inlet for the molten prepolymer, a molten prepolymer feeding zone positioned subsequent to and communicating with the inlet, a polymerization reaction zone positioned subsequent to and communicating with the molten prepolymer feeding zone, and an outlet, for an aromatic polycarbonate, positioned subsequent to and communicating with the polymerization reaction zone, an evacuation device provided in association with the polymerization reaction zone of the casing, and a withdrawal device provided in association with the outlet of the casing, wherein the polymerization reaction zone has a space which has a guide securely held therein and extending downwardly therethrough, and wherein the polymerization reaction zone is separated from the molten prepolymer feeding zone through a distribution plate having a plurality of holes, through which the molten prepolymer feeding zone communicates with the polymerization reaction zone. The guide-wetting fall polymerizer device (a) has the capability of producing an aromatic polycarbonate at a rate of 1 t/hr or more.

For the purpose of stably producing a high quality, high performance aromatic polycarbonate on a commercial scale at a rate of 1 t/hr or more, it is required that the guide-wetting fall polymerizer device (a) have various characteristics. The present inventors have for the first time found the characteristics which should be possessed by the guide-wetting fall polymerizer device (a) for achieving the above-mentioned purpose. Specifically, the present inventors have found that the guide-wetting fall polymerizer device (a) needs to have the below-mentioned characteristics (1) to (5). First, the guide-wetting fall polymerizer device (a) needs to have the characteristic (1) that the opening area (A) (m$^2$) of the horizontal cross section of the upper portion 10 of the casing satisfies the following formula:

$$0.7 \leq A \leq 200.$$

The horizontal cross section is obtained by cutting the casing along a horizontal plane (a-a'), intersecting the polymerization reaction zone 5, as described in FIG. 1.

When the opening area (A) is less than 0.7 m$^2$, it is impossible to produce an aromatic polycarbonate in a desired amount. Further, for producing an aromatic polycarbonate in a desired amount while lowering the cost for producing the polymerization device, it is necessary that the opening area (A) be 200 m$^2$ or less.

The guide-wetting fall polymerizer device (a) needs to have the characteristic (2) that the guide-wetting fall polymerizer device (a) satisfies the following formula:

$$20 \leq A/B \leq 1,000$$

wherein A is as defined above for the characteristic (1) and B represents an minimum opening area (m$^2$) of the cross section of the outlet 7.

Outlet 7 connects the bottom of the lower tapered portion with the withdrawal device which is generally a device (such as a gear pump) capable of discharging a high viscosity substance. With respect to the shape of the cross section of outlet 7, there is no particular limitation; however, it is preferred that outlet 7 is a pipe having a circular or elliptical cross section. Between the bottom of the lower tapered portion and the withdrawal device, the shape of a cross section of outlet 7 may vary along the length of outlet 7. Further, the opening area of a cross section of outlet 7 may also vary along the length of outlet 7. Moreover, between the bottom of the lower tapered portion and the withdrawal device, outlet 7 may extends linearly or may have a curved portion. The casing may have two or more outlets 7.

In the method of the present invention, an aromatic polycarbonate or an aromatic polycarbonate prepolymer having an increased polymerization degree is withdrawn from the outlet of the polymerization device in the form of a molten material having a high melt viscosity. For withdrawing such a molten material from the polymerizer device (a) without lowering the quality thereof, the ratio (A/B) must satisfy the above-mentioned formula (i.e., $20 \leq A/B \leq 1,000$).

The guide-wetting fall polymerizer device (a) needs to have the characteristic (3) that the angle (C) (°) between the upper peripheral side wall of the upper portion and the inner surface of the lower peripheral wall of the lower tapered portion, as measured with respect to a vertical cross section of the casing, satisfies the following formula:

$$120 \leq C \leq 165.$$

It is generally considered that the closer to 90° the above-mentioned angle (C), the lower the amount of the material used for producing the casing. Therefore, only from the viewpoint of lowering the cost for producing the polymerizer device, it is preferred that the angle (C) is as close to 90° as possible. However, in the present invention, for transferring a molten material having a high melt viscosity and causing such a molten material to fall off from the lower end of the guide to outlet 7 without lowering the quality thereof, wherein the molten material is either the aromatic polycarbonate produced or the aromatic polycarbonate prepolymer having an increased polymerization degree, the angle (C) must be within the range of from 120 to 165°.

Further, the polymerizer device used in the present invention may have a plurality of different angles (C). For example, the polymerizer device has a plurality of different angles (C) when the horizontal cross section of the upper portion of the casing is elliptical and/or when the lower tapered portion of the casing has an asymmetrical shape. However, in such a case, all of the different angles (C) of the polymerizer device need to be within the above-mentioned range.

The guide-wetting fall polymerizer device (a) needs to have the characteristic (4) that the length (h) (cm) of the guide satisfies the following formula:

$$150 \leq h \leq 3,000.$$

When the length (h) of the guide is smaller than 150 cm, the polymerization degree of the molten prepolymer becomes unsatisfactory. On the other hand, when the length (h) of the guide is larger than 3,000 cm, the difference in the melt viscosity of the molten prepolymer as between the upper portion and lower portion of the guide becomes very large, so that the properties of the produced aromatic polycarbonate are likely to fluctuate.

The guide-wetting fall polymerizer device (a) may have only one guide or a plurality of guides. With respect to the number of the guide(s), there is no particular limitation so long as the below-mentioned total outer surface area (S1) (m$^2$) of the guide(s) is within the range of from 2 to 5,000 m$^2$. Specifically, for example, only one guide having a total outer surface area (S1) of 2,000 m$^2$ can be used. Alternatively, a plurality of guides can be used, wherein the sum of the total outer surface areas (S1) of the guides is 2,000 m$^2$. When it is intended to use a small number of guides each having a large total outer surface area, each guide may be one prepared by spirally winding a perforated plate or wire net which has a length of h. When a plurality of guides are used in the present invention, each guide independently has a length (h) within the above-mentioned range of from 150 to 3,000 cm. Further, when a plurality of guides are used, the lengths (h) of the guides need not be the same; however, from the viewpoint of stably producing an aromatic polycarbonate without fluctuation of the molecular weight of the aromatic polycarbonate, it is preferred that the lengths (h) of the guides are close to one another as much as possible.

The number of the guide(s) may vary depending on the shape thereof; however, the number of the guide(s) is generally from 1 to several millions. When the guide(s) is/are arranged in correspondence with the holes of the distribution plate, the number of the guide(s) may vary depending on the polymerization degree of the produced aromatic polycarbonate and the amount thereof; however, the number of the guide(s) is generally from 100 to 1,000,000, preferably from 200 to 500,000.

The guide-wetting fall polymerizer device (a) needs to have the characteristic (5) that the total outer surface area (S1) (m$^2$) of the guide satisfies the following formula:

$$2 \leq S1 \leq 5,000.$$

The total outer surface area (S1) (m$^2$) of the guide means the area of the overall surface of the guide with which the molten prepolymer is allowed to fall in contact (hereinafter, such an overall surface is frequently referred to simply as the "outer surface") during the polymerization. For example, when a pipe is used as a guide, wherein the opening of the pipe is sealed so that the molten prepolymer is allowed to fall in contact with only the outer surface of the pipe, the total outer surface area (S1) means the area of the outer surface of the pipe, and the inner surface (of the guide) with which the molten prepolymer does not get in contact is not included in the total outer surface area (S1). When a plurality of guides are used, the total outer surface area (S1) of the guides means the sum of the areas of the outer surfaces of the guides.

When the total outer surface area (S1) is less than 2 m$^2$, it is impossible to produce an aromatic polycarbonate in a desired amount. On the other hand, when the total outer surface area (S1) is larger than 5,000 m$^2$, not only does the cost for producing the polymerizer device become extremely high, but also the properties of the produced aromatic polycarbonate are likely to fluctuate.

It is surprising that the use of a guide-wetting fall polymerizer device having the above-mentioned characteristics (1) to (5) has enabled the stable production of a high quality, high performance aromatic polycarbonate which not only is colorless but also has excellent mechanical properties at a rate of 1 t/hr or more for a period of time as long as several thousands hours or more (for example, as long as 5,000 hours) without fluctuation of the molecular weight of the aromatic polycarbonate.

The reason why the method of the present invention enables the stable and efficient production of such an excellent aromatic polycarbonate on a commercial scale at a rate of 1 t/hr or more has not been fully elucidated. However, it is considered that, as a molten prepolymer to be polymerized, the molten prepolymer having absorbed therein an inert gas in the above-mentioned amount is used, and that a synergistic effect is achieved by simultaneously satisfying the above-mentioned characteristics (1) to (5) in addition to the effects which are, respectively, attributable to the characteristics (1) to (5). For example, it is considered that, when a guide having a large surface area and satisfying the formulae recited in the characteristics (4) and (5) is used, a large amount of a molten aromatic polycarbonate prepolymer is allowed to fall along and in contact with the guide even at a relatively low temperature, and the surface renewal of the molten prepolymer falling along and in contact with the guide is effectively performed, so that it becomes possible to produce a high quality aromatic polycarbonate in a large amount. Further, by the use of the wall of the lower tapered portion of the casing and the outlet which satisfy the formulae recited in the characteristics (3) and (2), it becomes possible to shorten the residence time of the produced aromatic polycarbonate in the polymerizer device, i.e., a period of time from the point in time of falling off of the produced aromatic polycarbonate from the lower end of the guide to the point in time of withdrawal of the produced aromatic polycarbonate from the outlet, so that discoloration and deterioration due to a long residence time of the produced aromatic polycarbonate in the polymerizer device can be prevented.

The above-mentioned advantageous production of an aromatic polycarbonate can be realized when the method of the present invention is used for a commercial scale production of an aromatic polycarbonate which is performed using a large-scale device for a long period of time. Needless to say, the cost of such a large-scale device is a very important factor in a commercial scale production of an aromatic polycarbonate. One of the advantages of the present invention is that the cost for producing the guide-wetting fall polymerizer device (a) having the characteristics (1) to (5) is low.

With respect to the requirement as to the dimensions of the polymerizer device and the guide, which are explained above, preferred dimensions are described below.

It is preferred that opening area A (m$^2$) of the horizontal cross section of the upper portion of the casing satisfies the formula: $0.8 \leq A \leq 180$, more advantageously the formula: $1 \leq A \leq 150$.

With respect to the ratio (A/B) of the opening area A (m$^2$) of the horizontal cross section of the upper portion of the casing to the minimum opening area B (m$^2$) of the cross section of the outlet, it is preferred that the ratio satisfies the formula: $25 \leq A/B \leq 900$, more advantageously the formula: $30 \leq A/B \leq 800$.

With respect to the angle (C) (°) between the upper peripheral side wall of the upper portion and the inner surface of the lower peripheral wall of the lower tapered portion, as measured with respect to a vertical cross section of the casing, it is preferred that the angle (C) satisfies the formula: $125 \leq C \leq$ to 160, more advantageously the formula: $135 \leq C \leq 155$. When a plurality of guide-wetting fall polymerizer devices (such as a first guide-wetting fall polymerizer device, a second guide-wetting fall polymerizer device, a third guide-wetting fall polymerizer device, . . . ) are used for stepwise elevating the polymerization degree of the molten prepolymer, it is preferred that the angles C1, C2, C3, . . . satisfy the formula: $C1 \leq C2 \leq C3 \leq$, wherein the angles C1, C2, C3, . . . respectively represent the above-mentioned angles (C) in the first guide-wetting fall polymerizer device, the second guide-wetting fall polymerizer device, third guide-wetting fall polymerizer device, . . .

The length (h) (cm) of the guide varies depending on various factors, such as the polymerization degree of the raw material prepolymer, the polymerization temperature, the polymerization pressure, the polymerization degree of the aromatic polycarbonate or prepolymer to be produced in the polymerizer device, and the amount thereof. However, it is preferred that the length (h) (cm) of the guide satisfies the formula: $200 \leq h \leq 2,800$ (when a plurality of guides are used, each guide has a length within this range), more advantageously the formula: $250 \leq h \leq 2,500$ (when a plurality of guides are used, each guide has a length within this range).

The total outer surface area (S1) (m$^2$) of the guide also varies depending on the factors mentioned above in connection with the length of the guide. However, it is preferred that the total outer surface area (S1) of the guide satisfies the formula: $4 \leq S1 \leq 4,500$, more advantageously the formula: $9 \leq S1 \leq 4000$.

In the present invention, during the operation of the polymerizer device, the polymerization reaction zone is generally kept under reduced pressure and, therefore, there is no particular limitation with respect to the casing of the polymerization reaction zone so long as the casing is capable of sustaining the reduced pressure. With respect to the shape of the horizontal cross section of the upper portion of the casing, there is no particular limitation. Examples of the shape of the horizontal cross section of the upper portion of the casing include a polygon, an ellipse and a circle. It is preferred that the shape of the horizontal cross section of the upper portion of the casing is a circle or a quasicircle. From the upper end to lower end of the upper portion of the casing, the shape of the horizontal cross section of the upper portion of the casing may be the same or different. From the viewpoint of ease in production of the polymerizer device, it is preferred that the shape of the horizontal cross section of the upper portion of the casing is the same from the upper end to lower end of the upper portion of the casing.

Therefore, it is preferred that the upper portion of the casing is cylindrical. In this case, it is preferred that the lower tapered portion of the casing is reverse conical, and that the outlet for the aromatic polycarbonate, which is positioned at the bottom of the lower tapered portion of the casing, is cylindrical.

With respect to the guide-wetting fall polymerizer device (a) used in the present invention, when the upper portion of the casing is cylindrical, the lower tapered portion of the casing is reverse conical, and the outlet is cylindrical, it is preferred that the inner diameter (D) (cm) of the upper portion, the length (L) (cm) of the upper portion, the inner diameter (d) (cm) of the outlet and the length (h) (cm) of the guide satisfy the following formulae:

$100 \leq D \leq 1,000$, $5 \leq D/d \leq 50$, $0.5 \leq L/D \leq 30$, and $h-20 \leq L \leq h+300$.

(When a plurality of guides are used, the length of each guide satisfies the above-mentioned formulae.)

In the present invention, it is more preferred that the inner diameter (D) (cm) of the upper portion satisfies the formula: $150 \leq D \leq 900$, more advantageously the formula: $200 \leq D \leq 800$. It is more preferred that the ratio (D/d) satisfies the formula: $6 \leq D/d \leq 45$, more advantageously the formula: $7 \leq D/d \leq 40$. It is more preferred that the ratio (L/D) satisfies the formula: $0.6 \leq L/D \leq 25$, more advantageously the formula: $0.7 \leq L/D \leq 20$. It is more preferred that the length (L) (cm) of the upper portion and the length (h) (cm) of the guide satisfy the following formula:

$h-10 \leq L \leq h+250$.

(When a plurality of guides are used, the length of each guide satisfies the above-mentioned formula.) It is still more preferred that the length (L) (cm) of the upper portion and the length (h) (cm) of the guide satisfy the following formula:

$h \leq L \leq h+200$.

(When a plurality of guides are used, the length of each guide satisfies the above-mentioned formula.)

As explained above, it has not yet been fully elucidated why the method of the present invention enables a stable production of a high quality, high performance aromatic polycarbonate which not only is colorless but also has excellent mechanical properties, on a commercial scale at a high polymerization rate for a long period of time, wherein the molecular weight of the aromatic polycarbonate can be maintained at a desired level. However, the reason why a high molecular weight aromatic polycarbonate can be produced at a high polymerization rate by the method of the present invention is considered as follows.

In the present invention which employs the guide-wetting fall polymerizer device (a), a molten prepolymer having absorbed therein a specific amount of an inert gas is fed from the inlet for the molten prepolymer to the inert gas-absorbed molten prepolymer feeding zone, and the molten prepolymer fed to the inert gas-absorbed molten prepolymer feeding zone is introduced through a distribution plate into the polymerization reaction zone having a guide, wherein the inert gas-absorbed molten prepolymer is allowed to fall along and in contact with the surface of the guide while increasing the polymerization degree of the molten prepolymer. During the fall of the molten prepolymer along and in contact with the guide, the internal agitation and surface renewal of the molten prepolymer are effectively performed, thereby effectively removing phenol and the like. As a result, the polymerization reaction proceeds at a high rate. The melt viscosity of the molten prepolymer increases in accordance with the progress of the polymerization reaction, thus increasing the adhesion strength of the molten prepolymer to the guide. Therefore, the amount of the molten prepolymer adhering to the surface of the guide increases as the molten prepolymer proceeds to the lower portion of the guide. This also means that the residence time (i.e., the polymerization reaction time) of the molten prepolymer on the surface of the guide increases. Further, the molten prepolymer which is falling along and in contact with the guide by the action of gravity has a very large surface area per unit weight and the surface renewal of the molten prepolymer is effectively performed. Thus, the method of the present invention easily enables the production of a high molecular weight aromatic polycarbonate from a molten prepolymer, which is impossible by the use of a conventional mechanical agitation type polymerizer device. This is one of the advantages of the polymerizer device used in the present invention.

Hereinbelow, an explanation is made with respect to the reason why the method of the present invention enables a stable production of an aromatic polycarbonate wherein the molecular weight of the aromatic polycarbonate can be maintained at a desired level. In the polymerization reaction performed in the guide-wetting fall polymerizer device (a), the amount of a molten prepolymer adhering to the guide increases as the prepolymer proceeds to the lower portion of the guide. However, the molten prepolymer only exhibits an adhesion strength which corresponds to the melt viscosity thereof. Therefore, when the guide-wetting fall polymerizer device has a plurality of guides, molten prepolymer masses at a specific height of all of the guides have substantially the same volume and substantially the same melt viscosity. In addition, the molten prepolymer is continuously fed from the molten prepolymer feeding zone (which is provided above the polymerization reaction zone) to the polymerization reaction zone. Therefore, from the lower ends of the guides, molten prepolymer masses (having an increased polymerization degree) which have substantially the same melt viscosity continuously fall off to the lower tapered portion of the casing. As a result, aromatic polycarbonate masses having substantially the same polymerization degree, each of which is produced by allowing the molten prepolymer to fall along and in contact with the guide, are collected at the bottom portion of the lower tapered portion of the casing, thereby enabling the continuous production of an aromatic polycarbonate wherein the molecular weight of the aromatic polycarbonate is maintained at a desired level. This is another advantage of the polymerizer device used in the present invention.

The aromatic polycarbonate collected in the bottom portion of the lower tapered portion of the casing is continuously withdrawn from the outlet by means of a withdrawal device, which is generally a device (such as a gear pump) having the capability of discharging a high viscosity substance (in FIG. 1, discharge pump 8 is a withdrawal device). In general, the withdrawn aromatic polycarbonate is extruded by an extruder and, then continuously pelletized.

With respect to the distribution plate of the guide-wetting fall polymerizer device used in the present invention, the surface of the distribution plate is generally selected from a flat surface, a corrugated surface, and a surface which is thick at a central portion thereof. The shape of the distribution plate is generally selected from a circle, an ellipse, a triangle, a polygon and the like. The shape of the opening of the holes of the distribution plate is generally selected from a circle, an ellipse, a triangle, a slit, a polygon, a star and the like.

The area of each hole of the distribution plate is generally from 0.01 to 100 $cm^2$, preferably from 0.05 to 10 $cm^2$, more preferably from 0.1 to 5 $cm^2$. The distance between mutually adjacent holes is generally from 1 to 500 mm, preferably from 25 to 100 mm, as measured between the centers of the mutually adjacent holes.

The distribution plate may have through holes. Also, the distribution plate may have tubes attached thereto, so that the hollow portions of the tubes serve as the holes of the distribution plate. Further, the holes of the distribution plate may have a tapered configuration.

In the present specification, the term "guide" of the guide-wetting fall polymerizer device means a body which has a large value in respect of the ratio of the length of the body (as measured in the direction perpendicular to the cross section) to the average perimeter of the cross section of the body. There is no particular limitation with respect to the above ratio, but the ratio is generally from 10 to 1,000,000, preferably from 50 to 100,000.

There is also no particular limitation with respect to the morphology of the cross section of the guide. Generally, the shape of the cross section of the guide is selected from a circle, an ellipse, a triangle, a quadrangle, a polygon having five or more sides, a star and the like. The shape of the cross section of the guide may be uniform or may vary along the length of the guide. The guide may be hollow.

The guide may be made of a single strand, such as a wire, a thin rod, or a thin pipe which has been pretreated so that the molten prepolymer cannot enter the inside of the pipe. Also, the guide may be made of a plurality of strands, wherein, for example, the strands are twisted together. Further, the guide may be a wire net or a punched plate. Moreover, the guide may be one having a spiral horizontal cross section.

The surface of the guide may be smooth or rough, or may have a protruding portion.

In the present invention, it is preferred that the guide is columnar (i.e., a wire, a thin rod or a thin pipe mentioned above), a wire net or a punched plate.

It is especially preferred that a plurality of guides, such as wires, thin rods or thin pipes, are used, wherein the guides are combined using horizontal supporting members which are attached to the guides at predetermined intervals along the lengths of the guides. As examples of such combined guides, there can be mentioned a wire net guide obtained by combining guides (such as wires, thin rods or thin pipes mentioned above) using horizontal supporting members which are attached to the guides at appropriate intervals (for example, at intervals of from 1 to 200 cm) along the lengths of the guides; combined wire net guides obtained by combining a plurality of wire net guides (which are laterally arranged) using horizontal supporting members which are attached to the guides at appropriate intervals (for example, at intervals of from 1 to 200 cm) along the lengths of the guides; and three-dimensionally combined guides (in the form of a jungle gym) obtained by combining guides (such as wires, thin rods or thin pipes mentioned above) using horizontal support materials which are attached to the guides at appropriate intervals (for example, at intervals of from 1 to 200 cm) along the lengths of the guides, so as to-form a lattice structure.

The horizontal supporting members are useful for keeping constant the intervals between the guides and for improving the strength of the combined guides having a flat, curved or three-dimensional structure. The materials used for producing the supporting member and the guides may be the same or different.

In the present invention, it is preferred that the guide is columnar or is a pipe which does not allow the molten prepolymer to enter the inside of the pipe (hereinafter, such a guide is referred to generically as a "columnar guide"), wherein the diameter (r) (cm) of the columnar guide satisfies the following formula:

$$0.1 \leq r \leq 1.$$

In the present invention, the guide is used not only for effecting the polymerization of a molten prepolymer while allowing the molten prepolymer to fall along and in contact with the surface of the guide, but also for retaining the molten prepolymer in the polymerization reaction zone for a predetermined period of time. The residence time of the molten prepolymer is closely related to the polymerization reaction time and, as mentioned above, the residence time and the amount of the molten prepolymer retained on the guide become increased in accordance with the increase in the melt viscosity of the molten prepolymer, wherein the melt viscosity increases in accordance with the progress of the polymerization reaction. Even when a molten prepolymer having a predetermined melt viscosity is used, the amount of the molten prepolymer retained on the guide varies depending on the outer surface area of the guide. In the case of a columnar guide, the amount of the prepolymer retained on the columnar guide varies depending on the diameter of the guide.

It is necessary that the guide used in the guide-wetting fall polymerizer device (a) have strength sufficient to sustain not only the weight of the guide as such, but also the weight of the prepolymer retained on the guide. In this respect, the thickness of the guide is important. When the guide is a columnar guide, it is preferred that the diameter (r) of the guide is in the above-mentioned range of from 0.1 to 1 cm.

It is more preferred that the diameter (r) (cm) of the guide satisfies the formula: $0.15 \leq r \leq 0.8$. It is still more preferred that the diameter (r) (cm) of the guide satisfies the formula: $0.2 \leq r \leq 0.6$.

The material used for the guide is preferably selected from metals, such as stainless steel, carbon steel, Hastelloy, nickel, titanium, chromium, aluminum and other alloys, and a polymer having a high heat resistance. Among them, stainless steel is especially preferred. If desired, the surface of the guide may be treated with, for example, plating, lining, passivation, or washing with an acid or phenol.

With respect to the positional relationship between the guide and the distribution plate, and to the positional relationship between the guide and the holes of the distribution plate, there is no particular limitation as long as the molten prepolymer fed to the polymerizer device can pass downwardly through the distribution plate and fall along and in contact with the guide. The guide and the distribution plate may be or may not be in contact with each other.

In the guide-wetting fall polymerizer device used in the present invention, the guide is preferably provided in correspondence with the holes of the distribution plate. However, the guide need not be provided in correspondence with the holes of the distribution plate as long as the molten prepolymer falling through the distribution plate gets in contact with the guide at an appropriate position of the guide.

Preferred examples of manners in which the guide is provided in correspondence with the holes of the distribution plate include: (1) a manner in which the upper end of the guide is fixed, for example, to the upper inner wall surface of the polymerizer device or an appropriate portion of the casing at the polymerization reaction zone, such that the guide extends downwardly through the hole of the distribution plate; (2) a manner in which the upper end of the guide is fixed to the upper circumferential edge of the hole, such that the guide extends downwardly through the hole of the distribution plate; (3) a manner in which the upper end of the guide is fixed to the lower surface of the distribution plate; and (4) a manner in which the guide is welded to a part of the hole of the distribution plate.

Examples of methods for causing the molten prepolymer to pass downwardly through the distribution plate provided in the polymerizer device and fall along and in contact with the guide include a method in which the prepolymer is allowed to fall only by liquid head or by gravity and a method in which the prepolymer on the distribution plate is pressurized by using a pump or the like to thereby force the molten prepolymer to pass downwardly through the distribution plate. It is preferred to employ a method in which a predetermined amount of the molten prepolymer is fed into the feeding zone of the polymerizer device under pressure using a feeding pump, and the molten prepolymer passes through the distribution plate and is allowed to fall along and in contact with the guide by gravity.

In the method of the present invention in which a molten prepolymer obtained by reacting an aromatic dihydroxy compound with a diaryl carbonate is caused to absorb a specific amount of an inert gas, and the resultant inert gas-absorbed molten prepolymer is polymerized by using a specific guide-wetting fall polymerizer device, the polymerization reaction is generally performed at 80 to 350° C. The polymerizer device used in the present invention has no mechanical stirrer and, hence, there is no sealed portion for the stirrer. Therefore, an entrance of air or the like into the polymerizer device can be suppressed to a very low level. For this reason, it is possible to perform the polymerization reaction at a temperature which is higher than that in the case where a conventional polymerizer device having a mechanical stirrer is used; however, the polymerization reaction temperature need not be so high, e.g., a temperature close to 300° C.

In the polymerizer device used in the present invention, during the fall of the prepolymer along and in contact with the guide by gravity, the prepolymer is spontaneously stirred, thereby causing an effective surface renewal. Therefore, the polymerization reaction proceeds even at a relatively low temperature. The polymerization reaction temperature is preferably in the range of from 100 to 290° C., more preferably from 150 to 270° C. One of the advantages of the method of the present invention is that a satisfactory polymerization degree can be achieved even at a lower reaction temperature than in the case of the polymerization using a conventional polymerizer device having a mechanical stirrer. One of the reasons why a high quality, high performance aromatic polycarbonate (which is free from discoloration and lowering of properties) can be obtained by the method of the present invention is that the polymerization reaction can be performed at a relatively low temperature.

In the method of the present invention, an aromatic monohydroxy compound (e.g., phenol) is formed during the polymerization reaction. The rate of the polymerization reaction can be increased by removing the above-mentioned aromatic monohydroxy compound from the polymerization reaction system.

Preferred examples of methods for removing the aromatic monohydroxy compound (e.g., phenol) from the polymerization reaction system include a method in which an inert gas which does not adversely affect the polymerization reaction, such as nitrogen gas, argon gas, helium gas, carbon dioxide gas, a lower hydrocarbon gas or the like, is introduced into the polymerizer device, so as to remove the by-produced aromatic monohydroxy compound in such a form as entrained by the inert gas; and a method in which the polymerization reaction is performed under reduced pressure. These methods may be used in combination.

When an inert gas is introduced into the polymerizer device, there is no need for introduction of a large amount of the inert gas into the polymerizer device and the inert gas may be introduced in such an amount that the inside of the polymerizer device is maintained to be an inert gas atmosphere.

The preferred reaction pressure in the polymerizer device used in the present invention varies depending on the type and molecular weight of the aromatic polycarbonate to be produced, the polymerization temperature and the like. However, when the aromatic polycarbonate is produced from a molten prepolymer obtained from bisphenol A and diphenyl carbonate, the preferred reaction pressure is as follows: when the number average molecular weight of the molten prepolymer is 5,000 or less, the pressure is preferably in the range of from 400 to 3,000 Pa; when the number average molecular weight of the molten prepolymer is in the range of from 5,000 to 10,000, the pressure is preferably in the range of from 50 to 500 Pa; and when the number average molecular weight of the molten prepolymer is more than 10,000, the pressure is preferably 300 Pa or less, more preferably in the range of from 20 to 250 Pa.

When the method of the present invention is practiced, it is possible to produce an aromatic polycarbonate having a desired polymerization degree using only one guide-wetting fall polymerizer device. However, depending on the polymerization degree of a molten prepolymer as a starting material or the desired productivity of an aromatic polycarbonate, it is also preferred to employ a mode in which two or more guide-wetting fall polymerizer devices are connected in series, and the steps (II) and (III) are performed in each of the guide-wetting fall polymerizer devices to thereby increase the polymerization degree of the aromatic polycarbonate. This mode is preferred in that a guide and reaction conditions which are appropriate from the view point of the polymerization degree of the prepolymer or the aromatic polycarbonate to be produced can be independently selected with respect to each of the polymerizer devices.

For example, when the polymerization degree of the prepolymer is increased by using a system in which a first guide-wetting fall polymerizer device, a second guide-wetting fall polymerizer device, a third guide-wetting fall polymerizer device, a forth guide-wetting fall polymerizer device and so on are connected in series in this order, the total outer surface areas of the guides in these guide-wetting fall polymerizer devices may be in the following relationships: $S1 \geq S2 \geq S3 \geq S4 \geq \ldots$, wherein $S1$, $S2$, $S3$ and $S4$, respectively, represent the total outer surface areas in the first, second, third and fourth guide-wetting fall polymerizer devices. Further, the polymerization reaction temperature may be the same among all of the polymerizer devices. Alternatively, the polymerization reaction temperature may be varied so that the polymerization reaction temperature is increased in accordance with the order of arrangement of the polymerizer devices (i.e., from the first to last guide-wetting fall polymerizer devices in the above-mentioned system). Similarly, the polymerization pressure may be the same among all of the polymerizer devices, and, alternatively, the polymerization reaction pressure may be varied so that the polymerization reaction pressure is decreased in accordance with the order of arrangement of the polymerizer devices (i.e., from the first to last polymerizer devices in the above-mentioned system).

For example, when two guide-wetting fall polymerizer devices (i.e., the "first guide-wetting fall polymerizer device" and the "second guide-wetting fall polymerizer device") are connected in series to thereby increase the polymerization degree, it is preferred that the total outer surface area (S1) (m$^2$) of the guide used in the first guide-wetting fall polymerizer device and the total outer surface area (S2) (m$^2$) of the guide used in the second guide-wetting fall polymerizer device satisfy the following formula:

$$1 \leq S1/S2 \leq 20.$$

It is more preferred that the total outer surface areas S1 and S2 satisfy the following formula:

$$1.5 \leq S1/S2 \leq 15.$$

In the method of the present invention, when a plurality of polymerizer devices are used, it is necessary that each of the molten prepolymer fed to the polymerizer devices have absorbed therein an inert gas. For example, when the molten prepolymer withdrawn from the first polymerizer device has an inert gas content lower than 0.0001 N liter, the molten prepolymer may, if desired, be caused to absorb a predetermined amount of an inert gas by using an inert gas absorption device before the molten prepolymer is fed to the second polymerizer device. Generally, the molten prepolymer withdrawn from the first polymerizer device has a relatively low viscosity and, hence, most of the inert gas absorbed in the molten prepolymer fed to the first polymerizer device gets released from the molten prepolymer during the polymerization performed in the first polymerizer device. Therefore, it is preferred that the molten prepolymer withdrawn from the first polymerizer device is caused to absorb a fresh inert gas prior to the feeding of the molten prepolymer to the second polymerizer device. The fresh inert gas absorbed in the molten prepolymer withdrawn from the first polymerizer device may be or may not be the same type as that of the inert gas absorbed in the molten prepolymer fed to the first polymerizer device.

In the present invention, the aromatic polycarbonate is produced at a rate of 1 t/hr or more. Since an aromatic hydroxy compound by-produced during the polymerization reaction is removed from the reaction system, it is necessary to feed the molten prepolymer as a raw material into the polymerizer device at a rate which is higher than 1 t/hr.

The feeding rate of the molten prepolymer varies depending on the polymerization degree thereof and the polymerization degree of the aromatic polycarbonate to be produced; however, for example, when the aromatic polycarbonate is produced at a rate of 1 t/hr, the feeding rate of the molten prepolymer is generally in the range of 1.01 to 1.5 t/hr, which is larger than the production rate of the aromatic polycarbonate by 10 to 500 kg/hr.

The reaction for producing the aromatic polycarbonate from the aromatic dihydroxy compound and the diaryl carbonate can be performed without using a catalyst. However, if desired, the reaction can also be performed in the presence of a catalyst for the purpose of increasing the polymerization rate. With respect to the catalyst, there is no particular limitation as long as the catalyst is conventionally used in the art.

Examples of catalysts include: hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1R^2R^3R^4)NB(R^1R^2R^3R^4)$ wherein $R^1$, $R^2$, $R^3$ and $R^4$ are as defined above, and phosphonium borates represented by the formula: $(R^1R^2R^3R^4)PB(R^1R^2R^3R^4)$ wherein $R^1$, $R^2$, $R^3$ and $R^4$ are as defined above; silicon compounds, such as silicon oxide, sodium silicate, a tetraalkylsilicon, a tetraarylsilicon and diphenyl-ethylethoxysilicon; germanium compounds, such as germanium oxide, germanium tetrachloride, germanium ethoxide and germanium phenoxide; tin compounds, such as tin oxide, a dialkyltin oxide, a dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide, alkoxides and aryloxides of titanium; and zirconium compounds, such as zirconium acetate, zirconium oxide, alkoxides and aryloxides of zirconium, and zirconium acetylacetone.

These catalysts can be used individually or in combination. The amount of the catalyst used is generally from $10^{-10}$ to 1% by weight, preferably from $10^{-9}$ to $10^{-1}$% by weight, more preferably from $10^{-8}$ to $10^{-2}$% by weight, based on the weight of the aromatic dihydroxy compound.

In a melt transesterification process, the polymerization catalyst used generally remains in the final aromatic polycarbonate, and such a polymerization catalyst is likely to adversely affect the properties of the aromatic polycarbonate. Therefore, it is preferred that the amount of the polymerization catalyst used is as small as possible. In the method of the present invention, the polymerization reaction can be efficiently performed and, hence, the amount of the polymerization catalyst used can be reduced. Thus, another advantage of the present invention is that a high quality aromatic polycarbonate can be produced due to the small amount of the polymerization catalyst remaining in the final aromatic polycarbonate.

In the present invention, there is no particular limitation with respect to the material used for the guide-wetting fall polymerizer device and a pipe used for connecting the polymerizer device with another polymerizer device or the like. The material is generally selected from stainless steel, carbon steel, Hastelloy, nickel, titanium, chromium, other alloys, and a polymer having a high heat resistance. If desired, the surface of the material may be treated with, for example, plating, lining, passivation, or washing with an acid or phenol. Stainless steel, nickel, glass lining and the like are especially preferred.

The aromatic polycarbonate produced by the method of the present invention has recurring units each independently represented by the following formula:

wherein Ar is as defined above.

It is especially preferred that the aromatic polycarbonate has a recurring unit represented by the following formula in an amount of 85 mol % or more, based on the total molar amount of the recurring units of the aromatic polycarbonate:

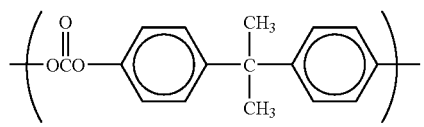

In general, the aromatic polycarbonate produced by the method of the present invention contains, as a terminal group, a hydroxyl group or an aryl carbonate group represented by the following formula:

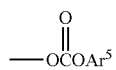

wherein $Ar^5$ is the same as $Ar^3$ or $Ar^4$ defined above.

When the aromatic polycarbonate contains, as terminal groups, both a hydroxyl group and an aryl carbonate group, there is no particular limitation with respect to the molar ratio of the hydroxyl group in the aromatic polycarbonate to the aryl carbonate group in the aromatic polycarbonate. However, the ratio is generally from 95/5 to 5/95, preferably from 90/10 to 10/90, more preferably from 80/20 to 20/80. It is especially preferred that the aromatic polycarbonate has the terminal aryl carbonate groups, wherein 85 mol % or more of the terminal aryl carbonate groups are phenyl carbonate groups.

The aromatic polycarbonate produced by the method of the present invention may comprise a plurality of aromatic polycarbonate main chains, wherein the aromatic polycarbonate main chains collectively have bonded thereto at least one side chain through a heterolinkage selected from the group consisting of an ester linkage and an ether linkage.

The amount of the heterolinkages contained in the aromatic polycarbonate is generally from 0.005 to 2 mol %, preferably from 0.01 to 1 mol %, more preferably from 0.05 to 0.5 mol %, per mol of carbonate linkages contained in the aromatic polycarbonate main chains.

When the aromatic polycarbonate contains heterolinkages in the above-mentioned amount, it is possible to improve the melt fluidity of the aromatic polycarbonate during the melt-molding of the aromatic polycarbonate without sacrificing other properties of the aromatic polycarbonate. Therefore, the aromatic polycarbonate containing heterolinkages in such an amount is suitable for precision molding and can be molded at a comparatively low temperature. Thus, such an aromatic polycarbonate can be used for producing a molded article having excellent properties. Further, by virtue of heterolinkages contained in the aromatic polycarbonate in such an amount, it is possible to shorten the molding cycle, which leads to energy saving.

The aromatic polycarbonate produced by the method of the present invention contains substantially no impurities. However, the aromatic polycarbonate produced by the method of the present invention may contain at least one metal compound selected from the group consisting of an alkali metal compound and an alkaline earth metal compound in an amount of generally from 0.001 to 1 ppm, preferably from 0.005 to 0.5 ppm, more preferably from 0.01 to 0.1 ppm, in terms of the total content of alkali metal atoms and alkaline earth metal atoms present in the aromatic polycarbonate.

When the amount of the above-mentioned metal compound of the aromatic polycarbonate is not more than 1 ppm, preferably not more than 0.5 ppm, more preferably not more than 0.1 ppm, such a small amount of the metal compound has no influence on the properties of the aromatic polycarbonate produced by the method of the present invention, so that the aromatic polycarbonate has high quality.

In the method of the present invention, it is most preferred to use an aromatic polycarbonate prepolymer produced from a high purity aromatic dihydroxy compound and a high purity diaryl carbonate, both of which contain substantially no halogen atoms, so that the halogen atom content of the produced aromatic polycarbonate is generally not more than 10 ppb. By the method of the present invention, it is possible to produce an aromatic polycarbonate having a halogen atom content of not more than 5 ppb, preferably not more than 1 ppb. Thus, it is still another advantage of the present invention that an extremely high quality product which is free from the adverse effects caused by the presence of halogen atoms can be obtained.

Thus, the method of the present invention has an advantage in that it is possible to stably and efficiently produce an aromatic polycarbonate without fluctuation of the molecular weight of the aromatic polycarbonate for a long time. Such advantage is achieved by the combined use of the molten prepolymer having absorbed therein a specific amount of an inert gas and the specific polymerizer device as apparent from the Examples below.

Hereinbelow, the present invention will be described in more detail with reference to the following Examples, which should not be construed as limiting the scope of the present invention. In the following Examples, various properties were measured and evaluated by the following methods.

(1) Number average molecular weight (Mn) of an aromatic polycarbonate:

The number average molecular weight (Mn) of an aromatic polycarbonate is measured by gel permeation chromatography (GPC) (solvent: tetrahydrofuran), utilizing the molecular weight conversion calibration curve obtained with respect to the standard mono-disperse polystyrene samples, wherein the molecular weight conversion calibration curve is represented by the following formula:

$$M_{PC}=0.3591 M_{PS}^{1.0388}$$

wherein $M_{PC}$ represents the molecular weight of the aromatic polycarbonate and $M_{PS}$ represents the molecular weight of the standard polystyrene.

(2) Color of an aromatic polycarbonate:

Using an injection molding machine, an aromatic polycarbonate is subjected to continuous molding at a cylinder temperature of 290° C. and a mold temperature of 90° C. to thereby obtain test specimens each having a length of 50 mm, a width of 50 mm and a thickness of 3.2 mm. The color of the aromatic polycarbonate is evaluated with respect to the obtained test specimens in accordance with the CIELAB method (Commission Internationale de l'Eclairage 1976 Lab Diagram), and the yellowness of the test specimens is expressed in terms of the b*-value.

(3) Tensile elongation of an aromatic polycarbonate:

Using an injection molding machine, an aromatic polycarbonate is subjected to molding at a cylinder temperature of 290° C. and a mold temperature of 90° C. to thereby obtain a test specimen having a thickness of 3.2 mm. The tensile elongation (%) of the obtained test specimen is measured in accordance with the ASTM D638.

(4) Amount of heterolinkage(s) contained in an aromatic polycarbonate:

The amount of the above-mentioned heterolinkage(s) (an ester linkage and/or an ether linkage) contained in an aromatic polycarbonate is measured by the method described in International Patent Application Publication No. WO 97/32916.

(5) Amount of an alkali metal compound and/or an alkaline earth metal compound (hereinafter, referred to as "alkali/alkaline earth metal compound"), which are/is contained in an aromatic polycarbonate:

The amount of an alkali/alkaline earth metal compound(s) (in terms of the total content of alkali metal atoms and alkaline earth metal atoms), which is/are contained in an aromatic polycarbonate, is measured by an ICP method.

(6) Halogen atom content of an aromatic polycarbonate:

The halogen atom content of an aromatic polycarbonate is measured by ion chromatography.

EXAMPLE 1

Figure 2:
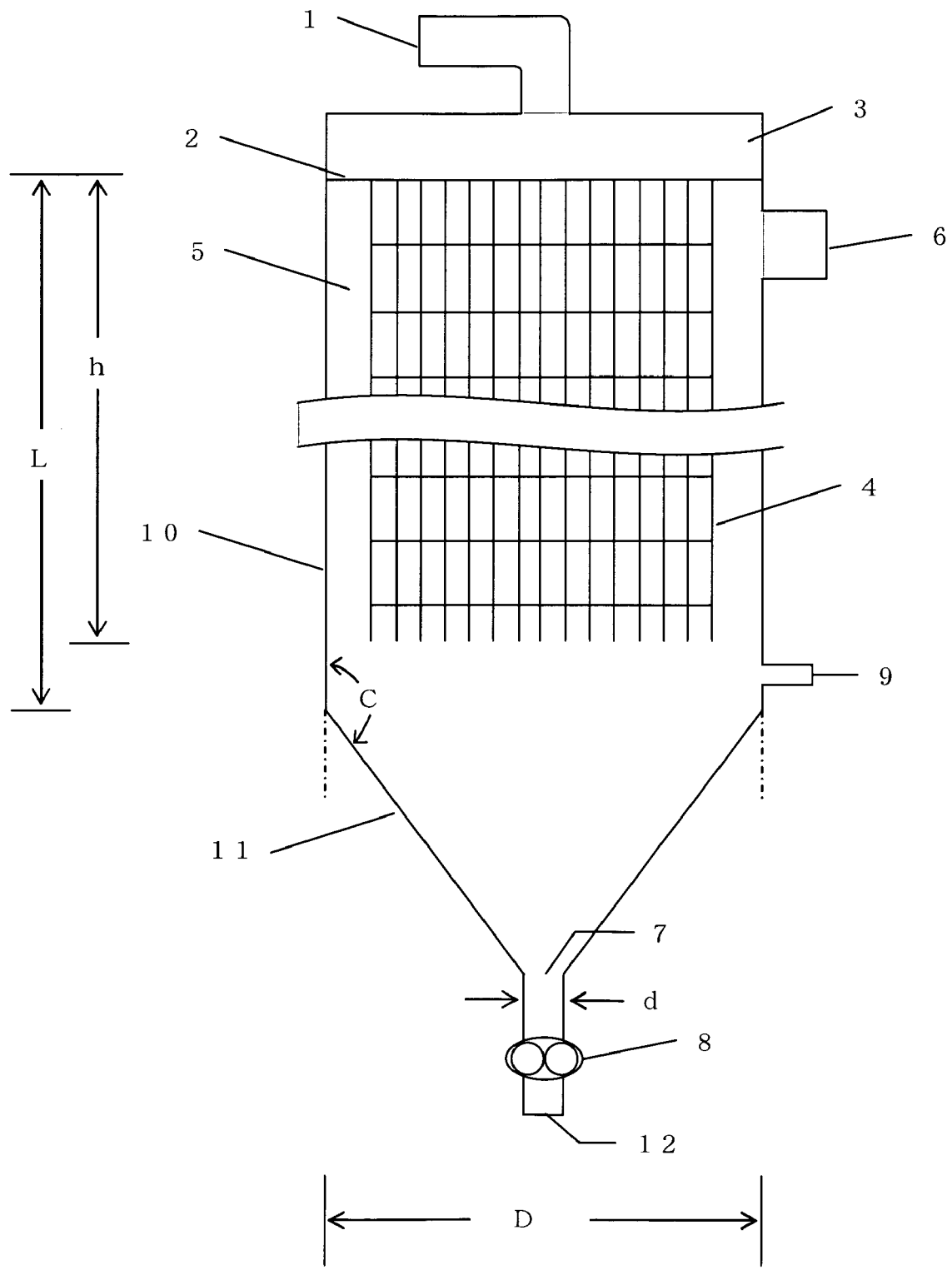
[FIG. 2]

An aromatic polycarbonate was produced using a system comprising a guide-wetting fall inert gas absorption device and a guide-wetting fall polymerizer device, each as shown in FIG. 2, which are connected in series. All parts of the inert gas absorption device and the polymerizer device are made of stainless steel except for molten prepolymer discharge pump 8 of the inert gas absorption device and aromatic polycarbonate discharge pump 8 of the polymerizer device. In the inert gas absorption zone of the inert gas absorption device, the upper portion of the casing is cylindrical, and the lower tapered portion of the casing is reverse conical. With respect to the dimensions of the inert gas absorption device and the guides provided therein, L=500 cm, h=400 cm, D=200 cm, d=20 cm, C=150°, and r=0.3 cm. Further, the diameter of each of the holes of the distribution plate is about 0.3 cm. In the polymerization reaction zone of the polymerizer device, the upper portion of the casing is cylindrical, and the lower tapered portion of the casing is reverse conical. With respect to the dimensions of the polymerizer device and the guides provided therein, L=1,000 cm, h=900 cm, D=500 cm, d=40 cm, C=155°, r=0.3 cm, S1=250 m$^2$, A=19.625 m$^2$, B=0.1256 m$^2$, and A/B=156. Further, the diameter of each of the holes of the distribution plate is about 0.3 cm. The inert gas absorption device has inlet 1, from which a molten prepolymer is fed to the inert gas absorption device and uniformly distributed to guides 4 (provided in inert gas absorption zone 5) through distribution plate 2. The upper portion of the casing of the inert gas absorption device has vacuum vent 6 (which is usually closed) at an upper portion thereof and introduction port 9 for an inert gas at a lower portion thereof. Further, the inert gas absorption device has an external jacket, and the inside of the inert gas absorption device is heated by passing a heating medium through the jacket. From molten prepolymer discharge pump 8, the inert gas-absorbed molten prepolymer is fed through inlet 1 to the polymerizer device and uniformly distributed to guides 4 (provided in polymerization reaction zone 5) through distribution plate 2. The upper portion of the casing of the polymerizer device has vacuum vent 6 at an upper portion thereof and introduction port 9 for an inert gas at a lower portion thereof. Further, the polymerizer device has an external jacket, and the inside of the polymerizer device is heated by passing a heating medium through the jacket.

Specifically, the production of an aromatic polycarbonate was performed as follows. Into molten prepolymer feeding zone 3 of the inert gas absorption device was continuously fed a molten aromatic polycarbonate prepolymer (number average molecular weight (Mn): 3,800) through inlet 1 using a feeding pump, wherein the molten aromatic polycarbonate prepolymer had been prepared by reacting bisphenol A with diphenyl carbonate (molar ratio of diphenyl carbonate to bisphenol A: 1.05) and had been maintained at 260° C. From molten prepolymer feeding zone 3 of the inert gas absorption device, the molten aromatic polycarbonate prepolymer was continuously charged into inert gas absorption zone 5 through distribution plate 2 and allowed to fall along and in contact with guides 4 to thereby cause the molten prepolymer to absorb the inert gas. The pressure in the inert gas absorption zone was maintained at 200,000 Pa by introducing nitrogen gas through introduction port 9 for an inert gas. During the inert gas absorption, the inert gas-absorbed molten prepolymer (amount of the inert gas absorbed in the molten prepolymer: 0.5 N liter per kg of the molten aromatic polycarbonate prepolymer) falling off from the lower end portions of guides 4 to lower tapered portion 11 of the casing of the inert gas absorption device was continuously discharged through outlet 7 by discharge pump 8 so that the amount of the inert gas-absorbed molten prepolymer at lower tapered portion 11 was constantly maintained around a predetermined level. The discharged inert gas-absorbed molten prepolymer was continuously fed through inlet 1 of the polymerizer device into inert gas-absorbed molten prepolymer feeding zone 3 of the polymerizer device. From feeding zone 3 of the polymerizer device, the inert gas-absorbed molten prepolymer was continuously charged into polymerization reaction zone 5 through distribution plate 2 and allowed to fall along and in contact with guides 4 to thereby perform a polymerization reaction of the inert gas-absorbed molten prepolymer. The pressure in the polymerization reaction zone was maintained at 60 Pa through vacuum vent 6. During the polymerization reaction, the produced aromatic polycarbonate falling off from the lower end portions of guides 4 to lower tapered portion 11 of the casing of the polymerizer device was discharged through outlet 7 at a flow rate of 5.2 t/hr by aromatic polycarbonate discharge pump 8 so that the amount of the aromatic polycarbonate at lower tapered portion 11 was constantly maintained around a predetermined level.

The number average molecular weight (Mn) of the aromatic polycarbonate product discharged through discharge port 12 at a point in time of 50 hours after the start of the operation was 11,000, and the aromatic polycarbonate product had an excellent color (b*-value: 3.2) and a tensile elongation as high as 98%.

The aromatic polycarbonate products, which were discharged through discharge port 12 at points in time of 60, 100, 500, 1,000, 2,000, 3,000, 4,000 and 5,000 hours after the start of the operation, stably had number average molecular weights (Mn) of 11,000, 10,980, 11,000, 10,980, 11,000, 11,000, 10,980 and 11,000, respectively. Further, when the aromatic polycarbonate products were shaped into sheets, the obtained sheets had no polymer mass having too high a molecular weight (such a polymer mass generally has a size of 1 mm or less and can be visually observed due to the difference in refractive index between the polymer mass and other portions of a sheet surrounding the polymer mass).

With respect to the thus obtained aromatic polycarbonate, various properties thereof were measured. As a result, it was found that the aromatic polycarbonate contained the above-mentioned alkali/alkaline earth metal compound in an amount of from 0.04 to 0.05 ppm (in terms of the total content of alkali metal atoms and alkaline earth metal atoms) and had a halogen atom (chlorine atom) content of less than 1 ppb, and that the amount of the heterolinkage(s) contained in the aromatic polycarbonate was from 0.12 to 0.15 mol %.

EXAMPLE 2

The production of an aromatic polycarbonate was performed using the same inert gas absorption device polymerizer device as those used in Example 1. Specifically, into molten prepolymer feeding zone 3 of the inert gas absorption device was continuously fed a molten aromatic polycarbonate prepolymer (number average molecular weight (Mn): 3,300) through inlet 1 using a feeding pump, wherein the molten aromatic polycarbonate prepolymer had been prepared by reacting bisphenol A with diphenyl carbonate (molar ratio of diphenyl carbonate to bisphenol A: 1.06) and had been maintained at 260° C. In the polymerizer device, the polymerization reaction was performed under substantially the same conditions as in Example 1 except that the pressure in polymerization reaction zone 5 was maintained at 90 Pa through vacuum vent 6, thereby producing an aromatic polycarbonate. During the polymerization reaction, the produced aromatic polycarbonate was continuously discharged through outlet 7 at a flow rate of 6.5 t/hr.

The aromatic polycarbonate products, which were discharged through discharge port 12 at points in time of 50, 100, 500, 1,000, 2,000, 3,000, 4,000 and 5,000 hours after the start of the operation, stably had number average molecular weights (Mn) of 7,700, 7,700, 7,720, 7,720, 7,700, 7,700, 7,700 and 7,720, respectively. Further, when the aromatic polycarbonate products were shaped into sheets, the obtained sheets had no polymer mass having too high a molecular weight.

With respect to the thus obtained aromatic polycarbonate, various properties thereof were measured. As a result, it was found that the aromatic polycartonate contained the above-mentioned alkali/alkaline earth metal compound in an amount of from 0.03 to 0.04 ppm (in terms of the total content of alkali metal atoms and alkaline earth metal atoms) and had a halogen atom (chlorine atom) content of less than 1 ppb, and that the amount of the heterolinkage(s) contained in the aromatic polycarbonate was from 0.08 to 0.1 mol %.

EXAMPLE 3

An aromatic polycarbonate was produced using a production system comprising two inert gas absorption devices (i.e., a first inert gas absorption device and a second inert gas absorption device) and two guide-wetting fall polymerizer devices (i.e., a first polymerizer device and a second polymerizer device), each of which is as shown in FIG. 2, wherein the first inert gas absorption device, the first polymerizer device, the second inert gas absorption device and the second polymerizer device are connected in series in this order. All parts of the inert gas absorption devices and the polymerizer devices are made of stainless steel except for molten prepolymer discharge pumps 8 of the inert gas absorption devices and aromatic polycarbonate discharge pumps 8 of the polymerizer devices. The first inert gas absorption device and the guides provided therein have substantially the same dimensions as those of the inert gas absorption device used in Example 1, except that the diameter of each of the holes of the distribution plate is about 0.2 cm. The second inert gas absorption device and the guides provided therein have substantially the same dimensions as those of the inert gas absorption device used in Example 1, except that the diameter of each of the holes of the distribution plate is about 0.6 cm. In polymerization reaction zone 5 of the first polymerizer device, the upper portion of the casing is cylindrical, and the lower tapered portion of the casing is reverse conical. With respect to the dimensions of the first polymerizer device and the guides provided therein, L=950 cm, h=850 cm, D=400 cm, d=20 cm, C=1500, r=0.35 cm, S1=750 m², A=13.6 m², B=0.0314 m², and A/B=433. Further, the diameter of each of the holes of the distribution plate is about 0.2 cm. On the other hand, the second polymerizer device and the guides provided therein have the same dimensions as those of the polymerizer device used in Example 1. Accordingly, S1/S2=750/250=3.

Specifically, the production of an aromatic polycarbonate was performed as follows. First, into molten prepolymer feeding zone 3 of the first inert gas absorption device was continuously fed a molten aromatic polycarbonate prepolymer (number average molecular weight (Mn): 2,500) through inlet 1 using a feeding pump, wherein the molten aromatic polycarbonate prepolymer had been prepared by reacting bisphenol A with diphenyl carbonate (molar ratio of diphenyl carbonate to bisphenol A: 1.06) and had been maintained at 265° C. From molten prepolymer feeding zone 3 of the first inert gas absorption device, the molten aromatic polycarbonate prepolymer was continuously charged into inert gas absorption zone 5 of the first inert gas absorption device through distribution plate 2 thereof and allowed to fall along and in contact with guides 4 to thereby cause the molten prepolymer to absorb an inert gas. The pressure in the inert gas absorption zone of the first inert gas absorption device was maintained at 180,000 Pa by introducing nitrogen gas through introduction port 9 for an inert gas. During the inert gas absorption, the inert gas-absorbed molten prepolymer (amount of the inert gas absorbed in the molten prepolymer: 0.04 N liter per kg of the molten aromatic polycarbonate prepolymer), which was falling off from the lower end portions of guides 4 to lower tapered portion 11 of the casing of the first inert gas absorption device, was discharged through outlet 7 at a predetermined flow rate by discharge pump 8 so that the amount of the inert gas-absorbed molten prepolymer at the bottom of lower tapered portion 11 was constantly maintained around a predetermined level. The discharged inert gas-absorbed molten prepolymer was continuously fed into molten prepolymer feeding zone 3 of the first polymerizer device through inlet 1 using a feeding pump. From molten prepolymer feeding zone 3, the molten aromatic polycarbonate prepolymer was continuously charged into polymerization reaction zone 5 of the first polymerizer device through distribution plate 2 thereof and allowed to fall along and in contact with guides 4 to thereby perform a polymerization reaction of the molten prepolymer. The pressure in the polymerization reaction zone of the first polymerizer device was maintained at 600 Pa through vacuum vent 6. During the polymerization reaction, the produced molten aromatic polycarbonate prepolymer having an increased polymerization degree (number average molecular weight (Mn): 5,300), which was falling off from the lower end portions of guides 4 to lower tapered portion 11 of the casing of the first polymerizer device, was discharged through outlet 7 at a predetermined flow rate by aromatic polycarbonate discharge pump 8 so that the amount of the molten aromatic polycarbonate prepolymer (having an increased polymerization degree) at lower tapered portion 11 was constantly maintained around a predetermined level. The discharged molten prepolymer was continuously fed into molten prepolymer feeding zone 3 of the second inert gas absorption device.

From molten prepolymer feeding zone 3 of the second inert gas absorption device, the molten aromatic polycarbonate prepolymer was continuously charged into inert gas absorption zone 5 of the second inert gas absorption device through distribution plate 2 thereof and allowed to fall along and in contact with guides 4 to thereby cause the molten prepolymer to absorb an inert gas. The pressure in the inert gas absorption zone of the second inert gas absorption device was maintained at 200,000 Pa by introducing nitrogen gas through introduction port 9 for an inert gas. During the inert gas absorption, the inert gas-absorbed molten prepolymer (amount of the inert gas absorbed in the molten prepolymer: 0.05 N liter per kg of the molten aromatic polycarbonate prepolymer), which was falling off from the lower end portions of guides 4 to lower tapered portion 11 of the casing of the second inert gas absorption device, was discharged through outlet 7 at a predetermined flow rate by discharge pump 8 so that the amount of the inert gas-absorbed molten prepolymer at the bottom of lower tapered portion 11 was constantly maintained around a predetermined level. This inert gas-absorbed molten prepolymer was continuously charged through inlet 1 into molten prepolymer feeding zone 3 of the second polymerizer device and continuously charged through distribution plate 2 thereof into polymerization reaction zone 5 of the second polymerizer device, wherein the inert gas-absorbed molten prepolymer was allowed to fall along and in contact with guides 4 to thereby perform a polymerization reaction of the inert gas-absorbed molten prepolymer. The pressure in the polymerization reaction zone of the second polymerizer device was maintained at 70 Pa through vacuum vent 6. During the polymerization reaction, the produced aromatic polycarbonate falling off from the lower end portions of guides 4 to lower tapered portion 11 of the casing of the second polymerizer device was discharged through outlet 7 at a flow rate of 7 t/hr by aromatic polycarbonate discharge pump 8 so that the amount of the produced aromatic polycarbonate at lower tapered portion 11 was constantly maintained around a predetermined level.

The number average molecular weight (Mn) of the aromatic polycarbonate product discharged through discharge port 12 of the second polymerizer device at a point in time of 50 hours after the start of the operation was 11,510, and the aromatic polycarbonate product had an excellent color (b*-value: 3.2) and a tensile elongation as high as 99%.

The aromatic polycarbonate products, which were discharged through discharge port 12 at points in time of 60, 100, 500, 1,000, 2,000, 3,000, 4,000 and 5,000 hours after the start of the operation, stably had number average molecular weights (Mn) of 11,530, 11,530, 11,500, 11,500, 11,510, 11,500, 11,520 and 11,510, respectively. Further, when the aromatic polycarbonate products were shaped into sheets, the obtained sheets had no polymer mass having too high a molecular weight.

With respect to the thus obtained aromatic polycarbonate, various properties thereof were measured. As a result, it was found that the aromatic polycarbonate contained the above-mentioned alkali/alkaline earth metal compound in an amount of from 0.03 to 0.05 ppm (in terms of the total content of alkali metal atoms and alkaline earth metal atoms) and had a halogen atom (chlorine atom) content of less than 1 ppb, and that the amount of the heterolinkage(s) contained in the aromatic polycarbonate was from 0.11 to 0.16 mol %.

INDUSTRIAL APPLICABILITY

In the method of the present invention, a molten aromatic polycarbonate prepolymer obtained by reacting an aromatic dihydroxy compound with a diaryl carbonate is caused to absorb an inert gas, and the resultant inert gas-absorbed molten prepolymer is polymerized by the use of a guide-wetting fall polymerizer device having a specific structure. It is surprising that, by the method of the present invention, a high quality, high performance aromatic polycarbonate which not only is colorless but also has excellent mechanical properties can be stably produced on a commercial scale at a rate of 1 t/hr or more for a long period of several thousands hours or more (for example, a period of time as long as 5,000 hours) without fluctuation of the molecular weight of the aromatic polycarbonate. Therefore, the method of the present invention can be very advantageously employed for the commercial scale production of an aromatic polycarbonate and is of great commercial value.

The invention claimed is:

1. A method for producing an aromatic polycarbonate, which comprises the following steps (I) to (III):
   (I) treating a molten aromatic polycarbonate prepolymer, obtained by reacting an aromatic dihydroxy compound with a diaryl carbonate, with an inert gas to thereby cause said molten prepolymer to absorb said inert gas, thereby obtaining an inert gas-absorbed molten prepolymer, wherein the amount of said inert gas absorbed into said molten prepolymer is from 0.0001 to 1 N liter per kg of said molten aromatic polycarbonate prepolymer, wherein the N liter means the volume in terms of liter or liters as measured under the normal temperature and pressure conditions,
   (II) feeding said inert gas-absorbed molten prepolymer into a guide-wetting fall polymerizer device (a),
   said guide-wetting fall polymerizer device (a) comprising:
   a casing having an inlet for said inert gas-absorbed molten prepolymer, an inert gas-absorbed molten prepolymer feeding zone positioned subsequent to and communicating with said inlet, a polymerization reaction zone positioned subsequent to and communicating with said inert gas-absorbed molten prepolymer feeding zone, and an outlet, for an aromatic polycarbonate, positioned subsequent to and communicating with said polymerization reaction zone,
   an evacuation device provided in association with said polymerization reaction zone of said casing, and
   a withdrawal device provided in association with said outlet of said casing,
   said polymerization reaction zone having a space which has a guide securely held therein and extending downwardly therethrough,
   said polymerization reaction zone being separated from said inert gas-absorbed molten prepolymer feeding zone through a distribution plate having a plurality of holes, through which said inert gas-absorbed molten prepolymer feeding zone communicates with said polymerization reaction zone, and
   (III) allowing said inert gas-absorbed molten aromatic polycarbonate prepolymer to fall along and in contact with the surface of said guide in said polymerization reaction zone, thereby effecting polymerization of said inert gas-absorbed molten prepolymer to produce an aromatic polycarbonate, wherein the casing in said guide-wetting fall polymerizer device (a) has, at its polymerization reaction zone, an upper portion defined by an upper peripheral side wall and a lower tapered portion defined by a lower peripheral wall which is inclined toward said outlet and continuously extends downwardly from said upper peripheral side wall, said lower tapered portion having said outlet at the bottom thereof, so that the produced aromatic polycarbonate falling off from said guide flows down on an inner surface of said lower peripheral wall of said lower tapered portion to said outlet, wherein said guide-wetting fall polymerizer device (a) has the following characteristics (1) to (5):

(1) the opening area (A) ($m^2$) of the horizontal cross section of said upper portion of said casing satisfies the following formula:

$0.7 \leq A \leq 200$;

(2) said guide-wetting fall polymerizer device (a) satisfies the following formula:

$20 \leq A/B \leq 1,000$ wherein A is as defined above for said characteristic (1) and B represents a minimum opening area ($m^2$) of the cross section of said outlet;

(3) the angle (C) (°) between said upper peripheral side wall of said upper portion and the inner surface of said lower peripheral wall of said lower tapered portion, as measured with respect to a vertical cross section of said casing, satisfies the following formula:

$120 \leq C \leq 165$;

(4) the length (h) (cm) of said guide satisfies the following formula:

$150 \leq h \leq 3,000$; and (5) the total outer surface area (S1) ($m^2$) of said guide satisfies the following formula:

$2 \leq S1 \leq 5,000$, and wherein the aromatic polycarbonate is produced at a rate of 1 t/hr or more.

2. The method according to claim 1, wherein said upper portion of said casing is cylindrical, said lower tapered portion of said casing is reverse conical, and said outlet is cylindrical, wherein the inner diameter (D) (cm) of said upper portion, the length (L) (cm) of said upper portion, the inner diameter (d) (cm) of said outlet and said length (h) (cm) of said guide satisfy the following formulae:

$100 \leq D \leq 1,000$, $5 \leq D/d \leq 50$, $0.5 \leq L/D \leq 30$, and $h-20 \leq L \leq h+300$.

3. The method according to claim 1 or 2, wherein said guide is columnar, and the diameter (r) (cm) of said guide satisfies the following formula:

$0.1 \leq r \leq 1$.

4. The method according to claim 1 or 2, wherein said guide-wetting fall polymerizer device (a) has connected thereto at least one additional guide-wetting fall polymerizer device (b), said at least one additional guide-wetting fall polymerizer device (b) having said characteristics (1) to (5), with the proviso that when a plurality of additional guide-wetting fall polymerizer devices (b) are used, the polymerizer devices (b) are connected in series, and wherein said steps (II) and (III) are performed in said at least one additional guide-wetting fall polymerizer device (b) to thereby increase the polymerization degree of the aromatic polycarbonate produced in said guide wetting fall polymerizer device (a).

5. The method according to claim 4, wherein said guide-wetting fall polymerizer device (a) has one additional guide-wetting fall polymerizer device (b) connected thereto, and wherein said total outer surface area (S1) ($m^2$) of the guide used in said guide-wetting fall polymerizer device (a) and the total outer surface area (S2) ($m^2$) of the guide used in said additional guide-wetting fall polymerizer device (b) satisfy the following formula:

$1 \leq S1/S2 \leq 20$.

6. The method according to claim 5, wherein the aromatic polycarbonate produced in said guide-wetting fall polymerizer device (a) is treated with an inert gas to thereby cause the aromatic polycarbonate to absorb said inert gas prior to the feeding of the aromatic polycarbonate into said additional guide-wetting fall polymerizer device (b).

7. An aromatic polycarbonate produced by the method of claim 1, wherein said aromatic dihydroxy compound and said dairy carbonate used for obtaining said molten aromatic polycarbonate prepolymer contain substantially no halogen atoms.

8. The aromatic polycarbonate according to claim 7, which has a halogen atoms content of 10 ppb or less, and contains at least one metal compound selected from the group consisting of an alkali metal compound and an alkaline earth metal compound in an amount of from 0.001 to 1 ppm in terms of the total content of alkali metal atoms and alkaline earth metal atoms.

9. The aromatic polycarbonate according to claim 7, which has a halogen atom content of 5 ppb or less, and contains at least one metal compound selected from the group consisting of an alkali metal compound and an alkaline earth metal compound in an amount of from 0.005 to 0.5 ppm in terms of the total content of alkali metal atoms and alkaline earth metal atoms.

10. The aromatic polycarbonate according to claim 7, which has a halogen atom content of 1 ppb or less, and contains at least one metal compound selected from the group consisting of an alkali metal compound and an alkaline earth metal compound in an amount of from 0.01 to 0.1 in ppm in terms of the total content of alkali metal atoms and alkaline earth metal atoms.

11. The aromatic polycarbonate according to any one of claims 7 to 10, which comprises a plurality of aromatic polycarbonate main chains, wherein said plurality of aromatic polycarbonate main chains collectively have bonded thereto at least one side chain through a heterolinkage selected from the group consisting of an ester linkage and an ether linkage, and wherein the amount of said heterolinkage contained in said aromatic polycarbonate is from 0.05 to 0.5 mol %, per mol of carbonate linkages contained in said plurality of aromatic polycarbonate main chains.

* * * * *